(12) United States Patent
Malleo et al.

(10) Patent No.: US 12,337,321 B2
(45) Date of Patent: Jun. 24, 2025

(54) SYSTEMS, DEVICES, AND METHODS FOR AUTOMATIC CELL SORTING

(71) Applicant: Cellares Corporation, South San Francisco, CA (US)

(72) Inventors: Daniele Malleo, Menlo Park, CA (US); Wilson Wai Toy, San Francisco, CA (US)

(73) Assignee: Cellares Corporation, South San Francisco, CA (US)

( * ) Notice: Subject to any disclaimer, the term of this patent is extended or adjusted under 35 U.S.C. 154(b) by 0 days.

(21) Appl. No.: 18/811,490

(22) Filed: Aug. 21, 2024

(65) Prior Publication Data
US 2025/0065331 A1 Feb. 27, 2025

Related U.S. Application Data

(60) Provisional application No. 63/520,861, filed on Aug. 21, 2023.

(51) Int. Cl.
*B01L 3/00* (2006.01)
*G01N 35/00* (2006.01)

(52) U.S. Cl.
CPC ... *B01L 3/502761* (2013.01); *B01L 3/502715* (2013.01); *G01N 35/0099* (2013.01);
(Continued)

(58) Field of Classification Search
CPC ......... B01L 3/502761; B01L 3/502715; B01L 2200/0652; B01L 2300/0663; B01L 2300/0816; G01N 35/0099
See application file for complete search history.

(56) References Cited

U.S. PATENT DOCUMENTS

| | | | |
|---|---|---|---|
| 3,728,227 | A | 4/1973 | Elson et al. |
| 4,234,023 | A | 11/1980 | Sogi et al. |

(Continued)

FOREIGN PATENT DOCUMENTS

| | | | |
|---|---|---|---|
| CN | 104203333 A | 12/2014 |
| CN | 108660060 A | 10/2018 |

(Continued)

OTHER PUBLICATIONS

ChargePoint (2021). Aseptic split butterfly valve 10-6 sterility assurance, located at https://www.thechargepoint.com/products/aseptic-split-butterfly-valve-10-6-sterility-assurance/, 2 total pages.

(Continued)

*Primary Examiner* — Brian J. Sines
(74) *Attorney, Agent, or Firm* — Cooley LLP

(57) ABSTRACT

The present disclosure relates to systems, devices, and methods for automated cell sorting within a cell processing system. In an embodiment, the present disclosure relates to an automated cell sorting system comprising a cartridge having a cell sorting module, where the cell sorting module comprises a flow cell, and an instrument within a bay of a cell processing workcell, where the instrument comprises a magnetic array couplable to the flow cell, each of the magnets within the magnetic array having a width of w and being spaced apart by between about w/3 to about ¾w, and wherein the flow cell has a height of between about 1/12w to about ⅛w.

19 Claims, 12 Drawing Sheets
(8 of 12 Drawing Sheet(s) Filed in Color)

(52) U.S. Cl.
CPC .......... *B01L 2200/0652* (2013.01); *B01L 2300/0663* (2013.01); *B01L 2300/0816* (2013.01)

(56) References Cited

U.S. PATENT DOCUMENTS

| | | | |
|---|---|---|---|
| 4,696,902 | A | 9/1987 | Bisconte |
| 4,839,292 | A | 6/1989 | Cremonese |
| 4,911,833 | A | 3/1990 | Schoendorfer et al. |
| 5,058,619 | A | 10/1991 | Zheng |
| 5,656,491 | A | 8/1997 | Cassani et al. |
| 6,649,419 | B1 | 11/2003 | Anderson |
| 7,550,287 | B2 | 6/2009 | Hibino et al. |
| 7,745,209 | B2 | 6/2010 | Martin et al. |
| 7,816,128 | B2 | 10/2010 | Nakashima et al. |
| 8,158,426 | B2 | 4/2012 | Wilson et al. |
| 8,158,427 | B2 | 4/2012 | Wilson et al. |
| 8,168,432 | B2 | 5/2012 | Wilson et al. |
| 8,273,572 | B2 | 9/2012 | Martin et al. |
| 8,415,144 | B2 | 4/2013 | Wilson et al. |
| 8,440,458 | B2 | 5/2013 | Zijlstra et al. |
| 8,470,589 | B2 | 6/2013 | Martin et al. |
| 8,492,140 | B2 | 7/2013 | Smith et al. |
| 8,546,142 | B2 | 10/2013 | Martin et al. |
| 8,697,443 | B2 | 4/2014 | Wilson et al. |
| 8,727,132 | B2 | 5/2014 | Miltenyi et al. |
| 8,809,044 | B2 | 8/2014 | Wilson |
| 8,846,399 | B2 | 9/2014 | Martin et al. |
| 8,956,860 | B2 | 2/2015 | Vera et al. |
| 9,040,290 | B2 | 5/2015 | Martin et al. |
| 9,045,721 | B2 | 6/2015 | Martin et al. |
| 9,080,149 | B2 | 7/2015 | Bosio et al. |
| 9,255,243 | B2 | 2/2016 | Wilson et al. |
| 9,279,099 | B2 | 3/2016 | Okano et al. |
| 9,290,730 | B2 | 3/2016 | Martin et al. |
| 9,410,114 | B2 | 8/2016 | Wilson et al. |
| 9,441,192 | B2 | 9/2016 | Wilson et al. |
| 9,499,780 | B2 | 11/2016 | Smith et al. |
| 9,534,195 | B2 | 1/2017 | Smith et al. |
| 9,556,485 | B2 | 1/2017 | Lin et al. |
| 9,567,565 | B2 | 2/2017 | Vera et al. |
| 9,597,355 | B2 | 3/2017 | Magnant |
| 9,625,463 | B2 | 4/2017 | Miltenyi et al. |
| 9,701,932 | B2 | 7/2017 | Smith et al. |
| 9,732,317 | B2 | 8/2017 | Wilson |
| 9,783,768 | B2 | 10/2017 | Larcher et al. |
| 9,845,451 | B2 | 12/2017 | Martin et al. |
| 10,047,342 | B2 | 8/2018 | Eibl et al. |
| 10,053,663 | B2 | 8/2018 | Kabaha et al. |
| 10,119,970 | B2 | 11/2018 | Miltenyi et al. |
| 10,131,876 | B2 | 11/2018 | Kaiser et al. |
| 10,253,316 | B2 | 4/2019 | Masquelier et al. |
| 10,294,658 | B2 | 5/2019 | Scannon et al. |
| 10,323,258 | B2 | 6/2019 | Bernate et al. |
| 10,329,559 | B1 | 6/2019 | Masquelier et al. |
| 10,385,307 | B2 | 8/2019 | Rowley et al. |
| 10,421,959 | B1 | 9/2019 | Masquelier et al. |
| 10,508,288 | B1 | 12/2019 | Bernate et al. |
| 10,519,437 | B1 | 12/2019 | Masquelier et al. |
| 10,533,156 | B2 | 1/2020 | Vera et al. |
| 10,584,333 | B1 | 3/2020 | Masquelier et al. |
| 10,584,334 | B1 | 3/2020 | Masquelier et al. |
| 10,588,994 | B2 | 3/2020 | Kawamura et al. |
| 10,620,212 | B2 | 4/2020 | Miltenyi et al. |
| 10,689,669 | B1 | 6/2020 | Feldman et al. |
| 10,705,090 | B2 | 7/2020 | Miltenyi et al. |
| 10,705,091 | B2 | 7/2020 | Miltenyi et al. |
| 10,723,986 | B2 | 7/2020 | Smith et al. |
| 10,724,043 | B2 | 7/2020 | Sixto et al. |
| 10,844,338 | B1 | 11/2020 | Smith et al. |
| 11,161,111 | B2 | 11/2021 | Kabaha et al. |
| 11,198,845 | B2 | 12/2021 | Parietti et al. |
| 11,371,018 | B2 | 6/2022 | Shi et al. |
| 11,376,587 | B2 | 7/2022 | Thakkar et al. |
| 11,447,745 | B2 | 9/2022 | Shi et al. |
| 11,701,654 | B2 | 7/2023 | Azersky et al. |
| 11,786,896 | B2 | 10/2023 | Thakkar et al. |
| 11,826,756 | B2 | 11/2023 | Azersky et al. |
| 11,872,557 | B2 | 1/2024 | Biz et al. |
| 12,157,119 | B2 | 12/2024 | Gerlinghaus et al. |
| 12,180,453 | B2 | 12/2024 | Chang et al. |
| 2003/0030272 | A1 | 2/2003 | Johnson et al. |
| 2005/0070018 | A1 | 3/2005 | Johnson et al. |
| 2005/0186671 | A1 | 8/2005 | Cannon et al. |
| 2005/0260743 | A1 | 11/2005 | Drake et al. |
| 2006/0194193 | A1 | 8/2006 | Tsuruta et al. |
| 2006/0257999 | A1 | 11/2006 | Chang et al. |
| 2007/0185472 | A1 | 8/2007 | Baumfalk et al. |
| 2008/0057568 | A1 | 3/2008 | Kan et al. |
| 2008/0176318 | A1 | 7/2008 | Wilson et al. |
| 2009/0042281 | A1 | 2/2009 | Chang et al. |
| 2009/0053799 | A1 | 2/2009 | Chang-Yen et al. |
| 2009/0247417 | A1 | 10/2009 | Haas et al. |
| 2010/0130732 | A1 | 5/2010 | Chung et al. |
| 2010/0151571 | A1 | 6/2010 | Vukasinovic et al. |
| 2011/0003380 | A1 | 1/2011 | Miltenyi et al. |
| 2011/0229927 | A1 | 9/2011 | Larsen et al. |
| 2012/0138156 | A1 | 6/2012 | Hofman et al. |
| 2013/0115617 | A1 | 5/2013 | Wilson |
| 2014/0309795 | A1 | 10/2014 | Norton et al. |
| 2015/0307829 | A1 | 10/2015 | Dedry et al. |
| 2015/0336096 | A1 | 11/2015 | Smith et al. |
| 2016/0208216 | A1 | 7/2016 | Vera et al. |
| 2016/0244714 | A1 | 8/2016 | Spuhler et al. |
| 2016/0303563 | A1 | 10/2016 | Granier et al. |
| 2016/0320381 | A1 | 11/2016 | Holmes et al. |
| 2016/0320422 | A1 | 11/2016 | Fritchie et al. |
| 2017/0058527 | A1 | 3/2017 | Williams et al. |
| 2017/0307502 | A1 | 10/2017 | Mason et al. |
| 2017/0313977 | A1 | 11/2017 | Wilson |
| 2017/0321226 | A1 | 11/2017 | Gill et al. |
| 2017/0348525 | A1 | 12/2017 | Sano et al. |
| 2017/0362554 | A1 | 12/2017 | Martin et al. |
| 2018/0031592 | A1 | 2/2018 | Dority |
| 2018/0051243 | A1 | 2/2018 | Hogan et al. |
| 2018/0078935 | A1 | 3/2018 | Hung et al. |
| 2018/0196918 | A1 | 7/2018 | Sadowski et al. |
| 2019/0212233 | A1 | 7/2019 | Jovanovich et al. |
| 2019/0275519 | A1 | 9/2019 | Castillo et al. |
| 2019/0292510 | A1 | 9/2019 | Tandon et al. |
| 2019/0293673 | A1 | 9/2019 | Wescott et al. |
| 2019/0316120 | A1 | 10/2019 | Masquelier et al. |
| 2019/0330579 | A1 | 10/2019 | Guenat et al. |
| 2020/0009557 | A1 | 1/2020 | Frigard et al. |
| 2020/0025782 | A1 | 1/2020 | Ahlfors |
| 2020/0048599 | A1 | 2/2020 | Firouzi et al. |
| 2020/0095550 | A1 | 3/2020 | Vera et al. |
| 2020/0159198 | A1 | 5/2020 | Kapre et al. |
| 2020/0224147 | A1 | 7/2020 | Rogers et al. |
| 2020/0283713 | A1 | 9/2020 | Ball et al. |
| 2020/0292552 | A1 | 9/2020 | Miltenyi et al. |
| 2020/0353004 | A1 | 11/2020 | Nowak et al. |
| 2020/0368411 | A1 | 11/2020 | Camisani et al. |
| 2020/0399578 | A1 | 12/2020 | Corso et al. |
| 2020/0406221 | A1 | 12/2020 | Dabrowski et al. |
| 2021/0001339 | A1* | 1/2021 | Liu .......... G01N 33/54326 |
| 2021/0032583 | A1 | 2/2021 | Smith et al. |
| 2021/0035655 | A1 | 2/2021 | Tanouchi et al. |
| 2021/0047668 | A1 | 2/2021 | Dabrowski et al. |
| 2021/0079344 | A1 | 3/2021 | Bosio et al. |
| 2021/0147807 | A1 | 5/2021 | Lickert et al. |
| 2021/0253997 | A1 | 8/2021 | Wilson |
| 2021/0269755 | A1 | 9/2021 | Smith et al. |
| 2021/0283565 | A1* | 9/2021 | Gerlinghaus .......... C12N 5/00 |
| 2021/0283606 | A1* | 9/2021 | Thakkar .......... C12M 35/02 |
| 2021/0301239 | A1 | 9/2021 | Natsume et al. |
| 2021/0324318 | A1 | 10/2021 | Parietti et al. |
| 2021/0354104 | A1 | 11/2021 | Pesch et al. |
| 2022/0047862 | A1 | 2/2022 | Chang et al. |
| 2022/0143610 | A1 | 5/2022 | Biz et al. |
| 2022/0150650 | A1 | 5/2022 | Rucker |
| 2022/0282199 | A1 | 9/2022 | Vann |
| 2022/0325219 | A1 | 10/2022 | Parietti et al. |
| 2022/0347683 | A1 | 11/2022 | Thakkar et al. |

(56) References Cited

U.S. PATENT DOCUMENTS

| | | |
|---|---|---|
| 2023/0149922 A1 | 5/2023 | Thakkar et al. |
| 2023/0321650 A1 | 10/2023 | Azersky et al. |
| 2023/0415154 A1 | 12/2023 | Pesch et al. |
| 2023/0415155 A1 | 12/2023 | Biz et al. |
| 2024/0165613 A1 | 5/2024 | Azersky et al. |
| 2024/0254426 A1 | 8/2024 | Elpel et al. |
| 2024/0255537 A1 | 8/2024 | Malleo et al. |
| 2024/0279588 A1 | 8/2024 | Malleo et al. |
| 2024/0318116 A1 | 9/2024 | Chang et al. |
| 2024/0326043 A1 | 10/2024 | Gerlinghaus et al. |
| 2024/0369586 A1 | 11/2024 | Tian et al. |
| 2024/0377420 A1 | 11/2024 | Cesarek |
| 2024/0390897 A1 | 11/2024 | Azersky et al. |
| 2024/0390898 A1 | 11/2024 | Azersky et al. |
| 2024/0399365 A1 | 12/2024 | Biz et al. |
| 2024/0402206 A1 | 12/2024 | Boppart et al. |
| 2025/0002837 A1 | 1/2025 | Bharat |

FOREIGN PATENT DOCUMENTS

| | | |
|---|---|---|
| EP | 0246912 A2 | 11/1987 |
| EP | 0991389 A1 | 4/2000 |
| EP | 0824380 B1 | 1/2002 |
| EP | 3134512 B1 | 1/2019 |
| EP | 2809449 B1 | 10/2019 |
| EP | 3359294 B1 | 5/2020 |
| EP | 3928867 A1 | 12/2021 |
| GB | 2268187 A | 1/1994 |
| JP | 2007325586 A | 12/2007 |
| KR | 20130018286 A | 2/2013 |
| WO | WO-2006102416 A2 | 9/2006 |
| WO | WO-2006112870 A1 | 10/2006 |
| WO | WO-2006118282 A1 | 11/2006 |
| WO | WO-2007139742 A1 | 12/2007 |
| WO | WO-2009072003 A2 | 6/2009 |
| WO | WO-2017041051 A1 | 3/2017 |
| WO | WO-2017123663 A1 | 7/2017 |
| WO | WO-2018015561 A1 | 1/2018 |
| WO | WO-2018102471 A1 | 6/2018 |
| WO | WO-2020009700 A1 | 1/2020 |
| WO | WO-2020014264 A1 | 1/2020 |
| WO | WO-2021168368 A1 | 8/2021 |
| WO | WO-2021183687 A2 | 9/2021 |
| WO | WO-2021212124 A1 | 10/2021 |
| WO | WO-2024112702 A1 | 5/2024 |
| WO | WO-2024197093 A2 | 9/2024 |

OTHER PUBLICATIONS

CPC (2014). "6 traits of non-spill: How quick disconnect couplings evolved for low-pressure fluid handling," White Paper 8004, 4 total pages.

CPC (2014). "How single-use connections advance aseptic processing: Increased process flexibility and reliability, reduced costs," White Paper 7004, 6 total pages.

CPC (2018). Comparison Guide: Tube Welders and Aseptic Connectors, Technical Guide 7009, 3 total pages.

EMD Millipore (2015). "Lynx® S2S Connector—Low temperature compatibility (-80"C)," 4 total pages.

Final Office Action for U.S. Appl. No. 17/331,554 mailed Aug. 29, 2024, 18 pages.

Final Office Action for U.S. Appl. No. 18/652,602 mailed Nov. 1, 2024, 29 pages.

Final Office Action mailed on Apr. 28, 2022, for U.S. Appl. No. 17/198,134, filed Mar. 10, 2021, 11 pages.

Final Office Action mailed on Apr. 28, 2022, for U.S. Appl. No. 17/331,554, filed May 26, 2021, 16 pages.

Final Office Action mailed on Jul. 31, 2023, for U.S. Appl. No. 17/331,554, filed May 26, 2021, 19 pages.

Final Office Action mailed on Mar. 31, 2023, for U.S. Appl. No. 17/579,478, filed Jan. 19, 2022, 8 pages.

Garcia et al., "Microfluidic Screening of Electric Fields for Electroporation" Sci Rep. (2016) Feb. 19; 6:21238. pages 1-11.

Genetic Engineering & Biotechnology News (2006). "Thermal welding for sterile connections," located at https://www.genengnews.com/magazine/47/thermal-welding-for-sterile-connections/, 5 total pages.

International Search Report and Written Opinion for International Application No. PCT/US2023/080593 dated Mar. 21, 2024, 12 pages.

International Search Report and Written Opinion for PCT Application No. PCT/IB2024/058105 mailed Dec. 16, 2024, 12 pages.

International Search Report and Written Opinion for PCT Application No. PCT/US2024/042795 mailed Dec. 16, 2024, 11 pages.

International Search Report mailed on Oct. 13, 2021, for PCT Application No. PCT/US2021/021773, filed on Mar. 10, 2021, 13 pages.

Invitation to Pay Additional fees for International Application No. PCT/IB2024/058148, mailed Jan. 2, 2025, 13 pages.

Jain, S. et al. (2011). "The complete automation of cell culture: improvements for high-throughput and high-content screening," J. Biomol. Screen 16:932-939.

Kato, R. et al. (2010). "A Compact, Automated Cell Culture System for Clinical Scale Cell Expansion from Primary Tissues," Tissue Engineering: Part C 16:947-956.

Kempner, M.E. and Felder, R.A., "A review of cell culture automation". JALA: Journal of the Association for Laboratory Automation (Apr. 2002); 7(2): 56-62.

Kino-Oka, M. et al. (2005). "Bioreactor Design for Successive Culture of Anchorage-Dependent Cells Operated in an Automated Manner," Tissue Engineering 11:535-545.

Knoll, A. et al. (2004). "Flexible automation of cell culture and tissue engineering tasks," Biotechnol. Prog. 20:1825-1835.

Lutkemeyer, D. et al. (2000). "First steps in robot automation of sampling and sample management during cultivation of mammalian cells in pilot scale," Biotechnol. Prog. 16:822-828.

MEDInstill (2021). INTACT™ Connectors, located at https://www.medinstill.com/intactconnectors.php, 1 total page.

Millipore® (2020). "Technical Brief—Choosing the right sterile connector based on design and sterility test results," 4 total pages.

Millipore Sigma (2020). "Lynx® CDR Connectors," Datasheet, 4 total pages.

Millipore Sigma (2021). Lynx® CDR Connectors, located at https://www.emdmillipore.com/US/en/product/Lynx-CDR-Connectors,MM_NF-C188801, 2 total pages.

Non-Final Office Action for U.S. Appl. No. 18/244,051 mailed Oct. 9, 2024, 10 pages.

Non-Final Office Action for U.S. Appl. No. 18/652,602 mailed Jul. 17, 2024, 30 pages.

Non-Final Office Action for U.S. Appl. No. 18/792,358 mailed on Nov. 6, 2024, 5 pages.

Non-Final Office Action for U.S. Appl. No. 18/799,963 mailed Sep. 30, 2024, 9 pages.

Non-Final Office Action for U.S. Appl. No. 18/810,386 mailed Nov. 18, 2024, 8 pages.

Non-Final Office Action mailed on Apr. 24, 2024, for U.S. Appl. No. 17/331,554, filed May 26, 2021, 17 pages.

Non-Final Office Action mailed on Dec. 22, 2022, for U.S. Appl. No. 17/579,478, filed Jan. 19, 2022, 8 pages.

Non-Final Office Action mailed on Dec. 3, 2021, for U.S. Appl. No. 17/331,556, filed May 26, 2021, 9 pages.

Non-Final Office Action mailed on Feb. 3, 2022, for U.S. Appl. No. 17/198,134, filed Mar. 10, 2021, 5 pages.

Non-Final Office Action mailed on Jun. 26, 2023, for U.S. Appl. No. 17/198,134, filed Mar. 10, 2021, 15 pages.

Non-Final Office Action mailed on Mar. 16, 2023, for U.S. Appl. No. 17/331,554, filed May 26, 2021, 16 pages.

Non-Final Office Action mailed on May 14, 2024, for U.S. Appl. No. 18/611,632, filed Mar. 20, 2024, 13 pages.

Non-Final Office Action mailed on Oct. 28, 2021, for U.S. Appl. No. 17/331,554, filed May 26, 2021, 11 pages.

Non-Final Office Action mailed on Oct. 6, 2021, for U.S. Appl. No. 17/198,134, filed Mar. 10, 2021, 7 pages.

(56) References Cited

OTHER PUBLICATIONS

Non-Final Office Action mailed on Sep. 13, 2023, for U.S. Appl. No. 18/141,329, filed Apr. 28, 2023, 7 pages.
Notice of Allowance (Corrected) mailed on Sep. 5, 2024, for U.S. Appl. No. 18/611,632, filed Mar. 20, 2024, 6 pages.
Notice of Allowance for U.S. Appl. No. 18/611,632 mailed Aug. 26, 2024, 9 pages.
Notice of Allowance for U.S. Appl. No. 18/810,388 mailed on Oct. 9, 2024, 9 pages.
Notice of Allowance mailed on Apr. 11, 2024, for U.S. Appl. No. 17/198,134, filed Mar. 10, 2021, 9 pages.
Notice of Allowance mailed on Jul. 18, 2023, for U.S. Appl. No. 17/849,422, filed Jun. 24, 2022, 8 pages.
Notice of Allowance mailed on Jul. 25, 2023, for U.S. Appl. No. 17/579,478, filed Jan. 19, 2022, 8 pages.
Notice of Allowance mailed on Jun. 8, 2023, for U.S. Appl. No. 17/849,422, filed Jun. 24, 2022, 8 pages.
Notice of Allowance mailed on Mar. 1, 2022, for U.S. Appl. No. 17/331,556, filed May 26, 2021, 8 pages.
Notice of Allowance mailed on Mar. 22, 2023, for U.S. Appl. No. 17/992,784, filed Nov. 22, 2022, 8 pages.
Notice of Allowance mailed on Oct. 4, 2023, for U.S. Appl. No. 18/141,329, filed Apr. 28, 2023, 8 pages.
Pharma Japan, "Astellas Set to Cut Development Time with Cell Culture Robot, Eyes 4 Billion Yen Profit per Product" Aug. 9, 2023, 3 pages.
Qu, B. et al., "Droplet Electroporation in Microfluidics for Efficient Cell Transformation with or without Cell Wall Removal," Lab Chip (2012) 12:4483-4488.
Saint Gobain (2017). "Pure-Fit® SC—Secure aseptic connections," Brochure, 5 total pages.
Sartorius Stedim Biotech (2011). "Opta® SFT," 4 total pages.
Schwartz C., "Optimizing Cell Separation with Beckman Coulter's Centrifugal Elutriation System," Beckmann Coulter Life Sciences (2014) 6 total pages.
SeriesLock™ (2021). Features and Specifications, located at https://serieslock.com/, 5 total pages.
Shi, Y. et al. (1992). "Performance of Mammalian Cell Culture Bioreactor with a New Impeller Design," Biotechnology and Bioengineering 40:260-270.
Steris (2018). "A compilation of material compatibilities with vaporized hydrogen peroxide," 2 total pages.
Steris (2018). "Sterility assurance levels (SALS): Irradiation," 3 total pages.
Steris (2020). "Overview of sterilization technology comparison," 1 total page.
Strahlendorf, K.A. et al. (2009). "Bio Pharm International—A review of sterile connectors," vol. 2009 Supplement, Issue 8, located at https://www.biopharminternational.com/view/review-sterile-connectors, 9 total pages.
U.S. Appl. No. 18/807,699, filed Aug. 16, 2024, by Beban et al.
U.S. Appl. No. 29/898,923, filed Aug. 2, 2023, by Gerlinghaus et al.
Written Opinion of the International Searching Authority mailed on Oct. 13, 2021, for PCT Application No. PCT/US2021/021773, filed on Mar. 10, 2021, 20 pages.

* cited by examiner

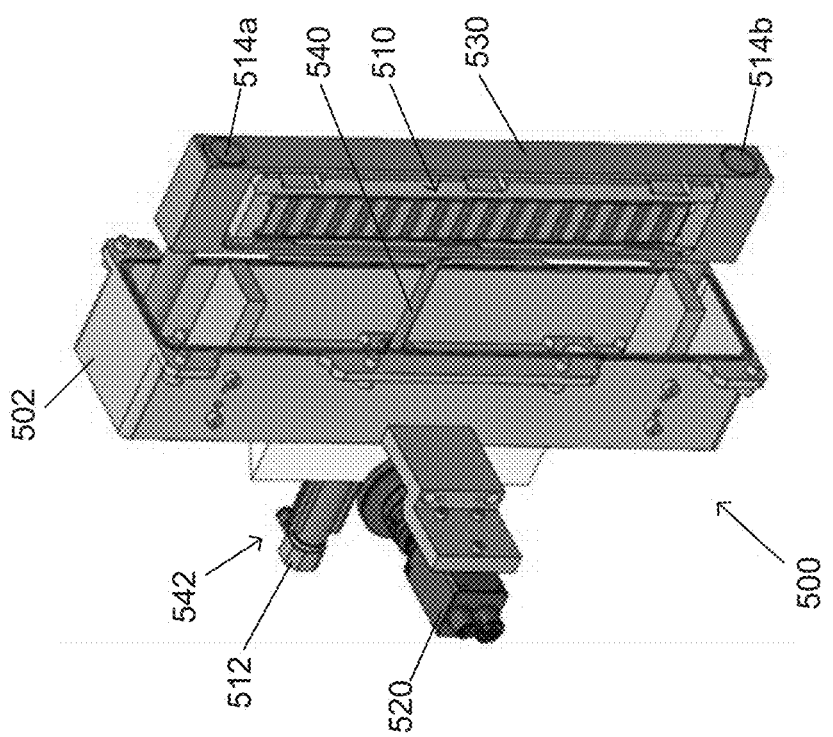
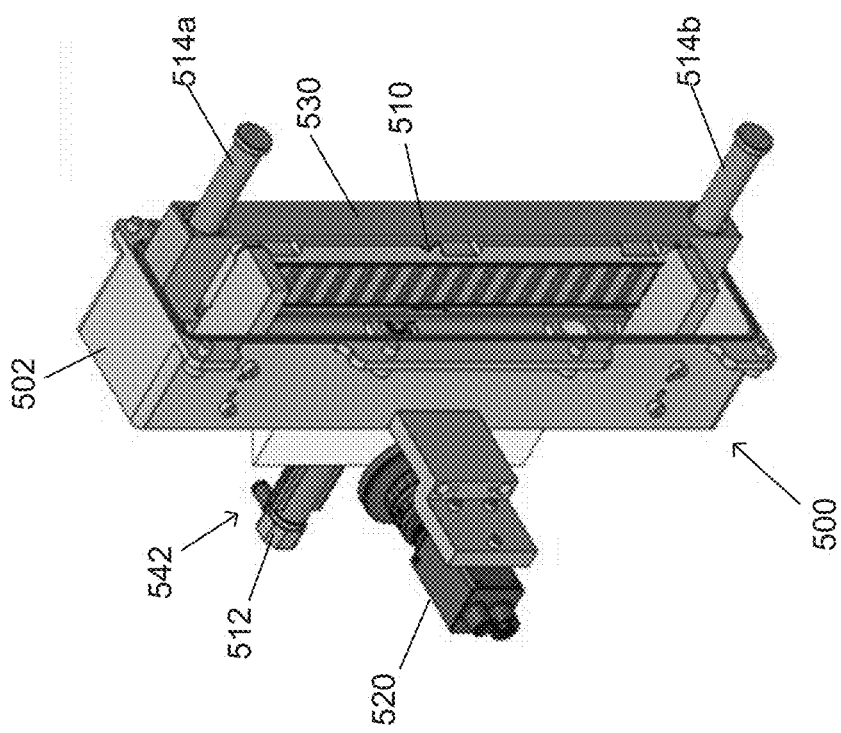
FIG. 5B
FIG. 5A

SYSTEMS, DEVICES, AND METHODS FOR AUTOMATIC CELL SORTING

CROSS REFERENCE TO RELATED APPLICATIONS

This application claims priority to U.S. Provisional Patent Application Ser. No. 63/520,861 filed Aug. 21, 2023, the content of which is incorporated herein by reference in its entirety for all purposes.

TECHNICAL FIELD

The present disclosure relates to systems, devices, and methods for cell sorting, for example, automated magnetic cell sorting.

BACKGROUND

Cell therapies involve collecting cells from an individual, processing the cells, and utilizing the processed cells to achieve a clinical response in the same or a different individual. Cell processing (e.g., growing or culturing cells) is a complex workflow that involves multiple steps, including sorting the cells to separate targeted cells from non-targeted material. Sorting cellular material using a cell sorting system can be performed by tagging targeted cells with magnetic particles, such that the targeted cells may be separated from the non-targeted cells by using a magnet to attract the targeted cells. The magnet is typically brought into close proximity with the cellular material manually, which is operationally inefficient and labor intensive. Typical cell sorting systems can only accommodate magnetic particles that are either micrometer-sized or nanometer-sized, so using inappropriately sized magnetic particles may clog the flow paths through the system. Even cell sorting systems with appropriately sized magnetic particles and/or components frequently experience clogging, which generally result in cell systems being single use as the components often cannot be rinsed or washed to release the clogged particles. In addition to sizing the components based on the magnetic particle size, cell sorting systems typically require advanced knowledge of the total throughput of cellular material in order to acquire components with volumes configured to accommodate the total throughput. Accordingly, additional systems and methods for cell sorting are desirable.

SUMMARY

The present disclosure relates generally to systems, devices, and methods for cell sorting within an automated cell processing system. In general, an automated cell sorting system may include a cartridge having a cell sorting module and an instrument within a bay of a cell processing workcell. The cell sorting module may include a flow cell. The flow cell may be configured to hold a volume of between about 1 mL to about 15 mL. The instrument may include a magnetic array that may be couplable to the flow cell. Each of the magnets within the magnetic array may have a width of w and may be spaced apart by between about w/3 to about ¾w, about w/3 to about ⅔w, about ⅖w to about ⅗w, or about w/2. The magnets of the magnetic array may be arranged with alternating polarities proximate to the flow cell. The magnetic array may be coupled to an actuator of the instrument. The actuator may be configured to translate the magnetic array. In some variations, the actuator may comprise a piston. The instrument may further include a sensor configured to measure a parameter of the cell sorting module. The cell sorting module may further include a purge line.

In some variations, the flow cell may include a film. The film may have a thickness of about 100 microns to about 500 microns. The flow cell may have a height of between about 1/12w to about ⅛w. The height of the flow cell may be between about 0.25 mm and about 3 mm. In some variations, the height of the flow cell may be about 1.5 mm.

In some variations, the cartridge may further include one or more additional modules selected from the group consisting of a bioreactor module, an electroporation module, an elutriation module, and a spinoculation module. The cell sorting module and the one or more additional modules may be fluidically connected. The cell processing workcell may include a robot configured to move the cartridge to a second bay.

Also described herein are methods directed to automatically sorting cells. A method for automated cell sorting may include coupling a cell sorting module within a cartridge to a magnetic array of an instrument within a workcell and flowing a cell suspension through a flow cell of the cell sorting module in batches. The cell suspension may include cells tagged by micrometer-sized or nanometer-sized magnetic particles, providing flexibility to the overall system. Each batch may be maintained within the flow cell for between about 3 and about 6 minutes. In some variations, the batch of the cell suspension may have a volume of between about 8 mL to about 10 mL. When nanometer-sized magnetic particles are used, they may have a diameter between about 50 nanometers to about 150 nanometers. When micrometer-sized magnetic particles are used, they may have a diameter between about 1 micron and about 6 microns. In some variations, between 1 to 20 batches may be flowed through the flow cell.

The method may further include decoupling the magnetic array by retracting an actuator coupled to the magnetic array, monitoring cell stiction within the flow cell using a prism and a sensor within the instrument, and/or purging the flow cell using a purge line. In some variations, decoupling the magnetic array, monitoring cell stiction, and/or purging the flow cell may be performed automatically. The method may still further include automatically transferring the magnetically tagged cells to a second module within the cartridge in accordance with a predefined workflow. The second module may be configured to perform a second cell processing step.

In some variations, a method for automated cell sorting may include moving a cartridge including a cell sorting module from a feedthrough to a bay of a workcell. The workcell may include an instrument having a magnetic array coupled to an actuator. The method may further include translating the magnetic array via the actuator to engage the cell sorting module and flowing a cell suspension through a flow cell of the cell sorting module in batches. The cell suspension may include cells that are tagged with either micrometer-sized or nanometer-sized magnetic particles. In some variations, the cell suspension may include cells that are tagged with both micrometer-sized and nanometer-sized magnetic particles.

Additional embodiments, features, and advantages of the invention will be apparent from the following detailed description and through practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5A is a perspective view of a magnetic array of an instrument in a retracted configuration. FIG. 5B is a perspective view of the magnetic array of the instrument shown in FIG. 5A in an extended configuration.

DETAILED DESCRIPTION

Figure 1A:
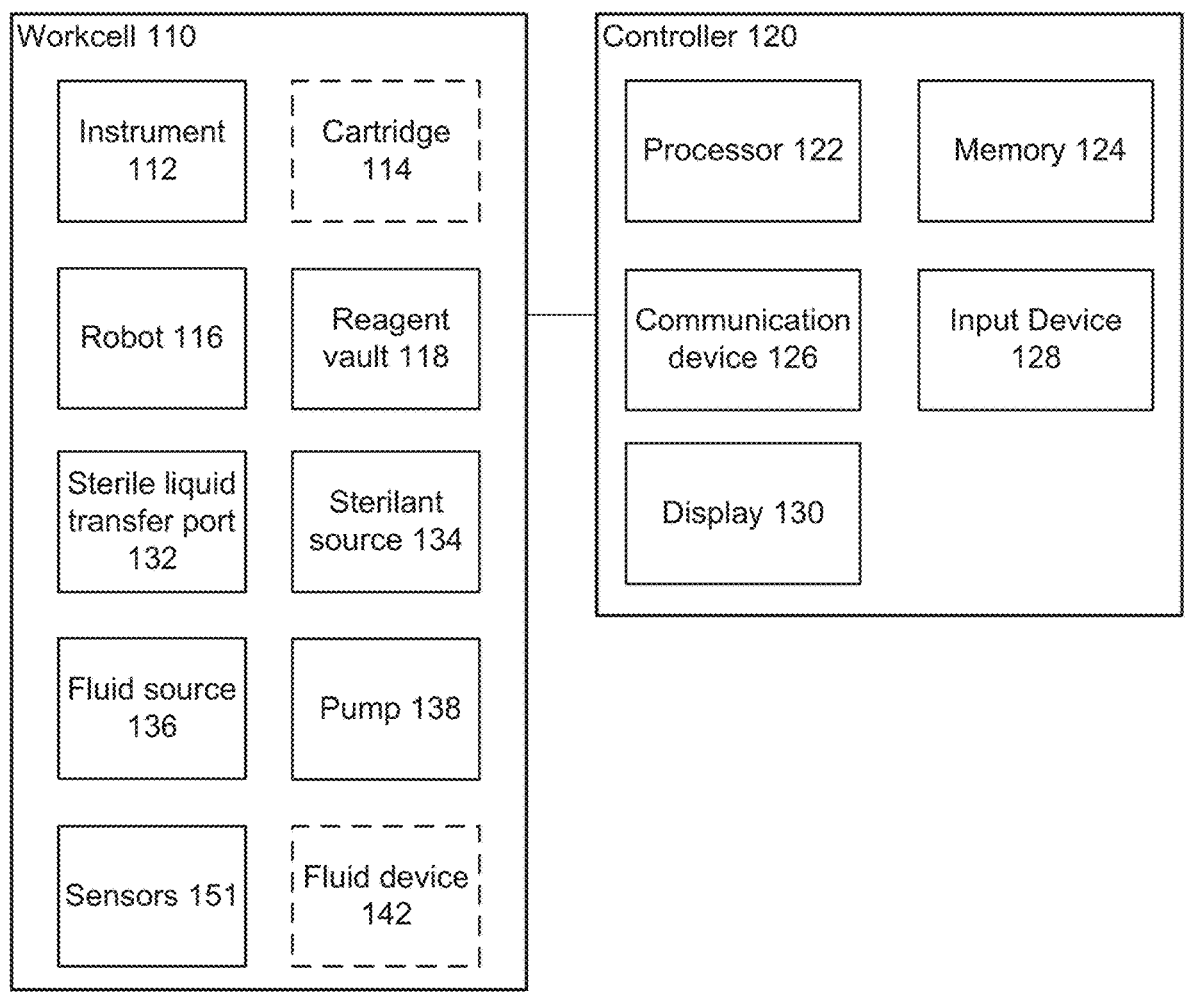
FIG. 1A is a block diagram of an illustrative variation of a cell processing system.

Disclosed herein are devices, systems, and methods for sorting cells in a cell processing system. The sorting of cells may include sorting a cell suspension, which may separate cells from other material in the cell suspension. Cell sorting may be performed by a cell sorting system, which may include one or more cell sorting modules within a cartridge and one or more cell sorting instruments within a bay of a cell processing workcell. The cell sorting module is couplable to the cell sorting instrument for performing the step of cell sorting. The cell sorting system may utilize magnetic particles coupled to cells of a pre-determined type in the cell suspension. The magnetic particles may facilitate positive or negative sorting. In positive sorting, the magnetic particles may couple to cells intended for further processing (e.g., targeted cells). The targeted cells may be separated from the non-targeted cells via one or more magnets that attract the magnetic particles, such that the non-targeted cells may be removed from the cell sorting system and discarded. In negative sorting, the magnetic particles may couple to cells that are not intended for further processing (e.g., non-targeted cells). The non-targeted cells may be separated from the targeted cells via one or more magnets that attract the magnetic particles, such that only the targeted cells may continue through the cell sorting system for further processing. The cell sorting system described herein may be configured to perform either positive or negative sorting, and is configured to sort nanometer-sized and/or micrometer-sized magnetic particles.

Accordingly, a batch of the cell suspension may flow through a cell sorting module within the cartridge comprising a flow cell. A magnetic array of a cell sorting instrument within a cell processing workcell may be engaged with (e.g., in contact with, proximate to) the cell sorting module, where the cell sorting instrument comprises a magnetic array. The magnetic array may be configured to attract the magnetic particles coupled to targeted cells. The targeted cells coupled to the magnetic particles (e.g., magnetically tagged cells) may be pulled towards the magnetic array such that the targeted cells may remain stationary within the flow cell while the non-targeted material (e.g., media, non-targeted cells, buffer) may continue to flow through the flow cell. The magnetic array may be disengaged from the cell processing module of the cartridge once the batch of cell suspension has been completely flown through the flow cell. The non-targeted material may be removed from the flow cell such that only the targeted cells remain within the flow cell. The targeted cells, which may be successfully sorted, may then be removed from the flow cell. The cell sorting module of the cartridge may be configured to transfer the sorted cells to another module of the cartridge (e.g., by being fluidically coupled to a second module), such that one or more additional cell processing steps may be performed on the cells within the cartridge.

The cell sorting module described herein may be configured to repeatedly perform cell sorting automatically with micrometer- and/or nanometer-sized magnetic particles. For example, the magnetic particles may be added to the cell suspension and subsequently flowed through the cell sorting module automatically in accordance with a predetermined workflow. The ability to sort both micrometer-sized and nanometer-sized magnetic particles is a unique feature that is not available in predicate systems, which are typically configured to work with only micrometer-sized particles or nanometer-sized particles, but not both. In another example, the magnetic array may engage and disengage the flow cell automatically in accordance with a predetermined workflow, which may facilitate more efficient cell sorting and eliminate manual intervention by a user. Furthermore, the cell sorting modules described herein may be configured to be rinsed or washed, such that the cell sorting module may be reused. For example, the cell sorting module may be fluidically connected to a fluidic manifold configured to introduce one or more cleaning agents into the cell sorting module after sorting a batch of cell suspension. Accordingly, multiple batches of cell suspension may be sorted in series. The flow cell of the cell sorting module may be configured to accommodate magnetic particles of varying sizes (e.g., micrometer- and/or nanometer-sized) without becoming clogged. The size of the magnetic particles may vary between batches. Additionally, the cell sorting module may be configured to remove any cells that may become stuck within the cell sorting module. For example, the cell sorting module may be configured to introduce a fluid (e.g., air bubbles) after disengaging the magnetic array from the flow cell. The fluid may be configured to remove any targeted cells that may be adhered (e.g., stuck) to the flow cell (e.g., cell stiction). That is, the fluid may apply a force of a magnitude greater than a stiction force (e.g., a capillary force, an electrostatic force, a van der Waals force, a residual stress) that is attracting the stuck cells to the flow cell. The force applied by the fluid to the stuck cells may be determined by one or more of a flow rate, velocity, volume, density, pressure, temperature, and humidity of the fluid. The force may continue to be applied until all of the stuck cells are released. Cell stiction may be monitored automatically by a sensor (e.g., camera) coupled to the cell sorting instrument within the workcell. Accordingly, the cell sorting modules and corresponding cell sorting instruments described herein may be configured to automatically and repeatedly perform high-throughput cell sorting using magnetic particles of various sizes.

I. Cell Processing System

The cell processing systems described herein may be configured to perform one or more cell processing steps in a workcell. The workcell may comprise a closed, automated environment, which may be configured to maintain a sterile environment. The workcell may receive a cartridge and perform one or more cell processing steps on cells in a cell solution (e.g., cell suspension) contained within the cartridge. For example, the cell processing system may comprise a workcell comprising a plurality of instruments that may each be configured to independently perform one or more cell processing steps to the cells and/or cell solution, and a robot capable of moving the cartridge within the workcell (e.g., between one or more bays). The robot and/or instruments may be configured to automatically operate such that operator assistance may not be required at any point during the workflow. For example, the robot may receive the cartridge and move the cartridge between locations (e.g., instruments, bays, storage vaults, feedthroughs) within the workcell according to a pre-programmed workflow, where each location may be associated with one or more cell processing steps. After performing one or more cell processing steps of the pre-programmed workflow, the workcell may be configured to transfer the cartridge out of the workcell (e.g., via the robot). Additionally, or alternatively, at least a portion of the cell solution may be transferred (e.g., via a fluid device or a fluidic manifold) to a second cartridge.

The cell solution (e.g., cell suspension) described herein may contain cells that may be processed for subsequent use in cell therapies. The cell solution may comprise cells (e.g., allogeneic cells) in a fluid, such as a media (e.g., cell culture media). The cell solution may contain cells from the same or different donors. Cells from the same donor may be split between one or more cartridges, such that separate cell processing steps may be performed on each cartridge and increase the overall throughput of the cell processing system described herein. The cell solution may be transferred to the cartridge prior to loading the cartridge into the workcell, such as by operating personnel. In some variations, the cartridge may be empty when loaded into the workcell such that the workcell may transfer a cell solution to the cartridge. In some variations, the cells from two or more cartridges may be combined according to a pre-determined ratio, which may correspond to an intended therapeutic treatment for a patient.

An illustrative cell processing system for use with the automated devices, systems, and methods is shown in FIG. 1A. Shown there is a block diagram of a cell processing system 100 comprising a workcell 110 and controller 120. The workcell 110 may comprise one or more of an instrument 112, a robot 116 (e.g., robotic arm), a reagent vault 118, a sterile liquid transfer port 132, a sterilant source 129, a fluid source 136, a pump 138, and a sensor(s) 151. A cartridge 114 and a fluid device 142, which may be provided outside of the workcell 110 and used within the workcell 110, are illustrated in dashed lines. In some variations, the fluid device 142 may be a sterile liquid transfer device (SLTD). However, it should be appreciated that the fluid device 142 may be configured to transfer any fluid (which includes liquids), whether sterile or not. The controller 120 may comprise one or more of a processor 122, a memory 124, a communication device 126, an input device 128, and a display 130.

The workcell 110 may comprise a fully, or at least partially, enclosed housing inside which one or more cell processing steps may be performed in a fully, or at least partially, automated process. The cartridge 114 may be moved using the robot 116 to reduce manual labor in the cell processing steps, and fluid transfers into and out of the cartridge 114 may also be performed in a fully or partially automated process, as will be described in detail herein. For example, one or more fluids may be stored in a fluid device 142, such that the one or more fluids may be transferred to the cartridge 114 and/or removed from the cartridge 114 via the fluid device 142. In some variations, the fluid device 114 may be moved within the system 100 by the robot 116. Accordingly, the workcell 110 described herein advantageously enables the transfer of fluids in an automated and metered manner for automating cell therapy manufacturing.

The workcell 110 may facilitate fluid transfers and/or cartridge transfers. For example, in some variations, the robot 116 may be configured to move more than one cartridge 114 between different bays to perform a predetermined sequence of cell processing steps (e.g., workflow). In this way, multiple cartridges 114 may be processed in parallel, as different steps of the cell processing workflow may be performed at the same time on different cartridges. In another example, a sterile liquid transfer port 132 may be coupled between two or more cartridges 114 to transfer a cell product and/or other fluid between the cartridges 114. Furthermore, the sterile liquid transfer port 132 may be coupled between any set of fluid-carrying components of the system 100 (e.g., cartridge 114, reagent vault 118, fluid source 136, fluid device 142, etc.). For example, a first sterile liquid transfer port may be coupled between a first cartridge and a corresponding sterile liquid transfer port of a fluid device.

Other suitable cell processing systems and aspects thereof are provided in, e.g., U.S. patent application Ser. No. 17/198,134, published as U.S. Patent Publication No. 2021/0283565, U.S. patent application Ser. No. 18/731,095, U.S. patent application Ser. No. 18/759,602, and U.S. patent application Ser. No. 18/807,699, the content of each of which is incorporated in its entirety by reference herein.

A. Cartridge

The cell processing systems described herein may comprise one or more cartridges having one or more modules configured to interface with, or releasably couple to, one or more instruments within the workcell. Some or all of the modules may be integrated in a fixed configuration within the cartridge, though they need not be. Indeed, one or more of the modules may be configurable or moveable within the cartridge, permitting various formats of cartridges to be assembled. For example, the cartridge may be a single, closed unit with fixed components for each module, or the cartridge may contain configurable modules coupled by configurable fluidic, mechanical, optical, and electrical connections. In some variations, one or more sub-cartridges, each containing a set of modules, may be used to perform various cell processing workflows. The modules may each be provided in a distinct housing or may be integrated into a cartridge or sub-cartridge with other modules. The disclosure generally shows modules as distinct groups of components for the sake of simplicity, but it should be noted that these modules may be arranged in any suitable configuration. For example, the components for different modules may be interspersed with each other such that each module may be defined by the set of connected components that collectively perform a predetermined function. However, the components of each module may or may not be physically grouped within the cartridge. In some embodiments, multiple cartridges may be used to process a single cell product through transfer of the cell product from one cartridge to another cartridge of the same or different type and/or by splitting cell product into more cartridges and/or pooling multiple cell products into fewer cartridges.

Generally, each of the instruments within the workcell interfaces with, or is releasably coupled to, its respective module or modules on the cartridge in order to carry out a specific cell processing step. For example, when a cartridge has a cell sorting module, it may be moved by the robot to a bay within the workcell having a cell sorting instrument so that the cell sorting module may be coupled to the cell sorting instrument in order to sort the cells within the cartridge. One advantage of such split module/instrument designs is that expensive components (e.g., motors, sensors, heaters, lasers, etc.) may be retained in the instruments of the system while less expensive components may reside in the cartridge.

Figure 1B:
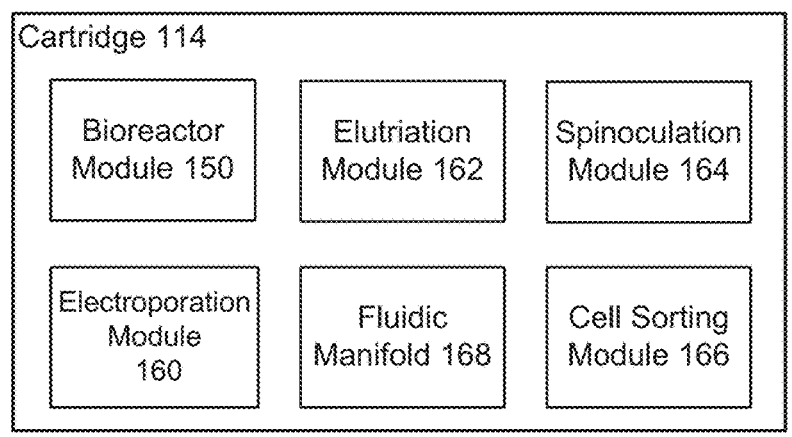
FIG. 1B is a block diagram of a cartridge that may be provided to the cell processing system of FIG. 1A.

As illustrated in FIG. 1B, the cartridge 114 may be configured to contain (e.g., house) a cell solution (e.g., cell suspension) for cell processing. Any number of cell processing steps may take place upon the cells within the cartridge. Accordingly, the cartridge 114 may comprise one or more of a bioreactor 150, an electroporation module 160, an elutriation module 162, a spinoculation module 164, a cell sorting module 166, and a fluidic manifold 168. In instances where cell sorting is to be performed, specific reagents (e.g., magnetic particles) may be added to a cell solution within one or more of the cartridge molecules. The magnetic particles are configured to couple to cells of a specific type (e.g., targeted cells) as described above. The elutriation module 162 may be configured to perform an elutriation process, wherein cellular material may be separated according to size, shape, and/or density. The spinoculation module 164 may be configured to perform a spinoculation process, wherein cells of different types may be bound together.

The fluidic manifold 168 may be configured to transfer one or more fluids between one or more modules of the cartridge 114. For example, the fluidic manifold 168 may transfer a cell solution from the bioreactor module 150 to the cell sorting module 166. The cell solution may include cellular material, including targeted cells coupled to magnetic particles. In another example, the fluidic manifold 168 may transfer a cell solution from the cell sorting module 166 to any other module 114, such as after a cell sorting process has been performed. The fluidic manifold 168 may be configured to transfer the sorted cells (e.g., targeted cells) to one module and non-targeted material to a different module.

Other suitable cartridges and cell processing modules that may be used with the automatic cell processing work cells described herein are provided in, e.g., U.S. patent application Ser. No. 18/652,602, U.S. patent application Ser. No. 18/532,621, U.S. patent application Ser. No. 18/620,826, and U.S. patent application Ser. No. 18/611,632, the content of each of which is incorporated in its entirety by reference herein. Other suitable sampling systems and devices are provided in, e.g., U.S. patent application Ser. No. 18/638,658, the content of which is incorporated in its entirety by reference herein.

Figure 2B:
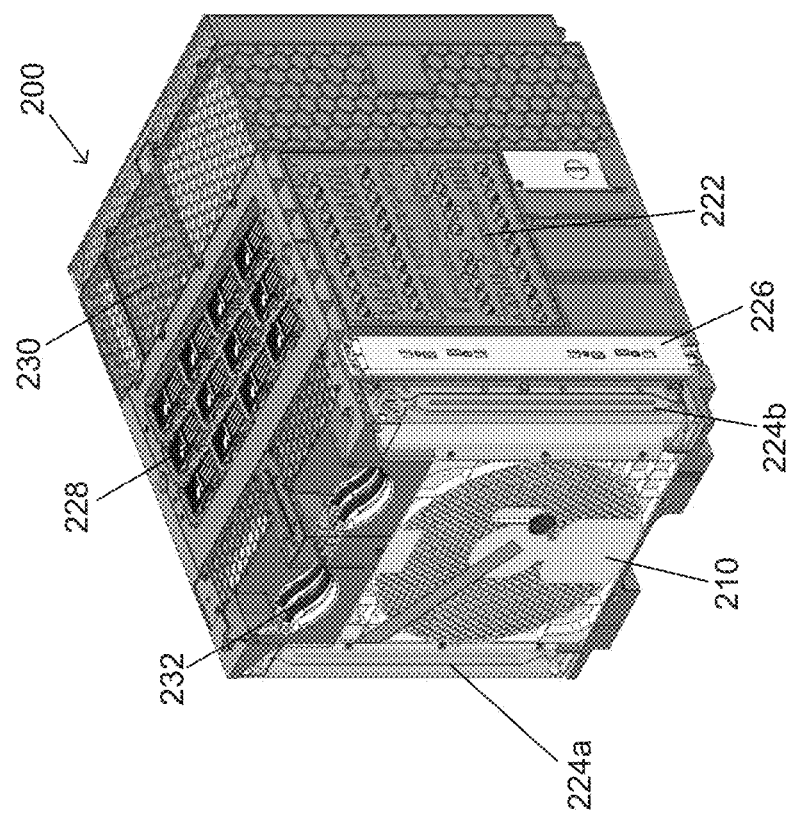
FIG. 2B is a front perspective view of the cartridge of FIG. 2A.
Figure 2A:
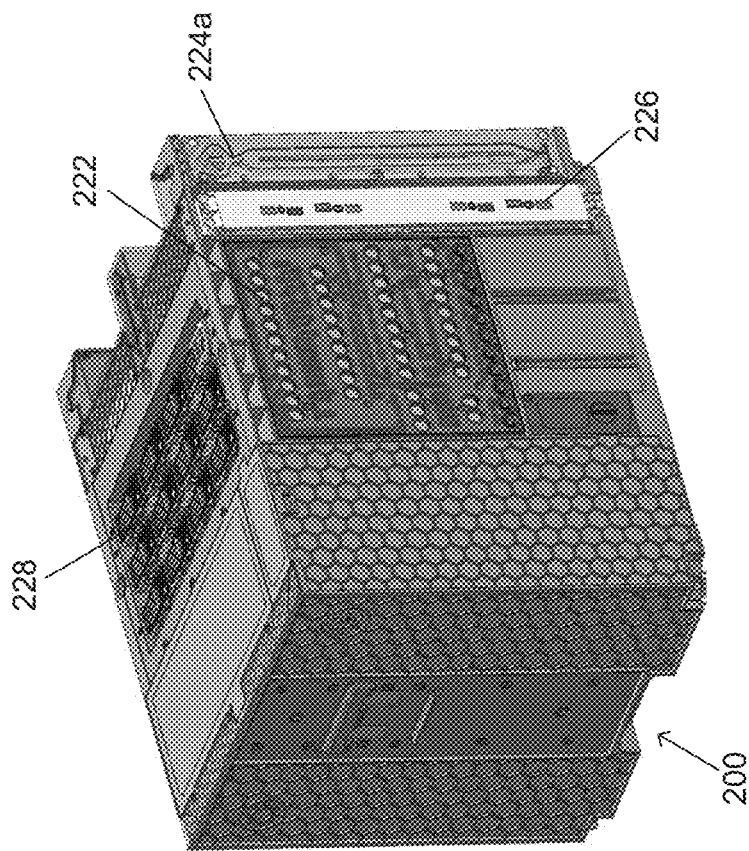
FIG. 2A is a rear perspective view of a cartridge that may be provided to a cell processing system.

Referring to FIGS. 2A and 2B, an illustrative variation of a cartridge 200 is shown. The cartridge 200 may comprise an elutriation module 210, a fluidic manifold 222, a first cell sorting module 224a, a second cell sorting module 224b, an auxiliary module 226, a fluid device tray 228, a liquid container 230, and a pump module 232. While shown in these figures as having two cell sorting modules, it should be understood that any number of cell sorting modules may be used as desirable. For example, the cartridge may contain 1, 2, 3, 4, or even more cell sorting modules depending on the size of the cartridge, the existence of other cell processing modules within the cartridge, and so on. The cell sorting modules 224a, 224b may perform a cell sorting process, as will be described in further detail below. The electroporation module 220 may be configured to facilitate intracellular delivery of macromolecules (i.e., transfection by electroporation). An electrical discharge from one or more capacitors, or current sources, may generate sufficient current in the chamber to promote transfer of a polynucleotide, protein, nucleoprotein complex, or other macromolecule into the cells in the cell product. The fluidic manifold 222 may comprise at least one fluid conduit. The at least one fluid conduit of the fluidic manifold 222 may be configured to allow fluid to pass therethrough. For example, the at least one fluid may be a liquid or a gas. In some variations, the at least one fluid may comprise a solution of cells of varying sizes and densities. The fluidic manifold 222 may comprise at least one fluid inlet and at least one fluid outlet, and may comprise at least one valve. The fluidic manifold 222 may be fluidically connected to at least one module within the cartridge 200. For example, the fluidic manifold 222 may be configured to transfer at least one fluid to the first and/or second cell sorting modules 224a, 224b. The fluidic manifold 222 may be in communication with a controller, such as the controller 120 described in reference to FIG. TA. For example, at least one valve of the fluidic manifold 222 may open and/or close in response to a command sent by the controller 120 to transfer fluid between various modules of the cartridge in accordance with a predetermined workflow. In addition to the fluidic manifold, the cartridge may also include one or more fluid conduits (e.g., tubes) to distribute fluid between the different modules.

The fluid transfer port tray 228 may comprise one or more ports configured to transfer fluid to or from one or more fluid devices. That is, each port of the fluid transfer port tray 228 may be configured to facilitate a sterile liquid transfer. In some variations, each port may be fluidically connected to a fluidic conduit configured to fluidically connect with at least one module of the cartridge 114. For example, each port of the fluid transfer port tray 228 may be fluidically connected to the fluidic manifold 222. In this way, a fluid may flow from a fluid device coupled to a port of the fluid transfer port tray 228 to the fluidic manifold 222, or vice versa. In some variations, each port of the fluid device tray 228 may be fluidically connected to the liquid storage container 230. The liquid storage container 230 may be configured to contain a fluid. In some variations, the fluid may be a liquid or a gas. In some variations, the liquid storage container 230 comprises a plurality of liquid containers. For example, the liquid storage container 230 may comprise one container, two containers, or three containers. The liquid storage container 230 may be fluidically connected to at least one module of the cartridge 200. In some variations, the liquid container 230 may be fluidically connected to the fluidic manifold 222. Accordingly, a fluid may flow between a port of the fluid transfer port tray 228, the fluidic manifold 222, and the liquid storage container 230.

The cartridge may further comprise a pump module 232 having a pump configured to pump fluid in one or more directions along at least one fluid path. For example, the pump module 232 may be configured to pump fluid to or from one or more of the elutriation module 210, the fluidic manifold 222, the cell sorting modules 224a, 224b, the auxiliary module 226, the fluid device tray 228, the liquid container 230, and any other module within the cartridge. The auxiliary module 226 may be configured to engage with at least one instrument and/or module. The auxiliary module 226 may comprise at least one electrical connector and/or at least one fluidic connector. In some variations, the auxiliary module 226 may be removed and replaced by any other module.

Various materials may be used to construct the cartridge (including the modules thereof) and the cartridge housing, including metal, plastic, rubber, and/or glass, or combinations thereof. The cartridge, its components, and its housing may be molded, machined, extruded, 3D printed, or any combination thereof. The cartridge may contain components that are commercially available (e.g., tubing, valves, fittings). The commercially available components may be attached or integrated with custom components or devices. The housing of the cartridge may constitute an additional layer of enclosure that further protects the sterility of the cell product.

i. Cell Sorting Module

The cell sorting module within the cartridge, when coupled to a cell sorting instrument within the workcell, may be configured to perform cell sorting. The cell sorting module may comprise a flow cell, and when the cell sorting module is engaged with a magnetic array of a cell sorting instrument, cells may be flowed through the flow cell of the cell sorting module to sort the cells into targeted cells and non-targeted cells. In some variations, the cell sorting process may target cells for use in additional cell processing steps and/or cell therapies. For example, the targeted cells may comprise T-cells, which may include CD4+ and/or CD8+ cells. Accordingly, the reagents may comprise magnetic particles (e.g., magnetically conjugated beads) that correspond to the targeted cells. That is, for example, the reagents may comprise magnetic particles configured to couple to CD4+ cells, CD8+ cells, or both. Once coupled (e.g., bound, tagged) to one or more magnetic particles, the targeted cells may be referred to as magnetically tagged cells. The flow cell may be disposed in proximity to a magnetic array of the cell sorting instrument, where the magnetic array may generate a magnetic field across the flow cell to attract the targeted cells for separation, capture, recovery, and/or purification. The magnetic field may comprise magnetic field lines that extend from a north pole of the magnetic array to a south pole of the magnetic array. The magnetic field lines may extend across the flow cell such that the magnetic field interacts with the fluid flowing therethrough. For example, the magnetic array may be configured to generate a magnetic field such that a magnetophoretic force equals a drag force exerted by the fluid flowing through the flow cell. That is, the magnetophoretic force may be applied to the one or more magnetic particles coupled to targeted cells such that the targeted cells remain stationary within the flow cell while the rest of the fluid continues to flow through the flow cell. The targeted cells may form a monolayer on an inner surface of the flow cell proximate to the magnetic array, such that the fluid may not become clogged within the flow cell. The continuing flow of fluid may apply the drag force to the stationary targeted cells.

Figure 1C:
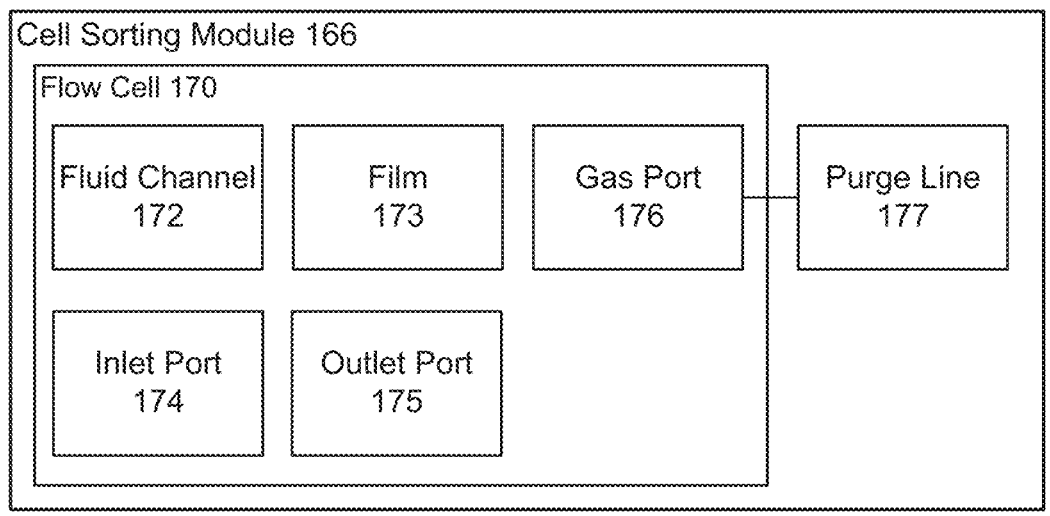
FIG. 1C is a block diagram of a cell sorting module of the cartridge of FIG. 1B.

Referring to FIG. 1C, a block diagram of an exemplary variation of a cell sorting module 166 is shown. The cell sorting module 166 may comprise a flow cell 170 and a purge line 177. The flow cell 170 may comprise a fluid channel 172, a film 173, an inlet port 174, an outlet port 175, and a gas port 176. The fluid channel 172 may be configured to receive a cell suspension. For example, the fluid channel 172 may comprise one or more sidewalls configured to retain a fluid (e.g., impermeable to liquid and gas). In some variations, the fluid channel 172 may comprise 1, 2, 3, or 4 sidewalls. The sidewalls may be arranged to define a channel, groove, depression, or lumen. In an exemplary variation, the fluid channel 172 may comprise 3 sidewalls arranged to define a channel with a rectangular cross-section. In further variations, the fluid channel 172 may comprise any suitable cross-sectional shape, such as a circle, a triangle, a square, or a combination thereof. The fluid channel 172 may comprise a length and a width, where the length may be greater than the width. The length and width of the fluid channel 172 may correspond to similar dimensions of a magnetic array, such as the magnetic array described further below. The fluid channel may be covered by the film 173, such that a cell suspension may be contained within the fluid channel 172 without leaking. Accordingly, the film 173 may be coupled to the body of the flow cell 170 by an adhesive configured to form a fluid-tight seal around the fluid channel 172. In further variations, the fluid channel 172 and film 173 may not be separate components, such that the fluid channel 172 may be integrally formed with the film 173.

The inlet port 174 and outlet port 175 may extend through the film 173, which may facilitate fluid flow through the fluid channel 172. For example, fluid (e.g., cell suspension) may flow into the fluid channel 172 via the inlet port 174 and out of the fluid channel 172 via the outlet port 175. Each of the inlet port 174 and outlet port 175 may be fluidically connected to the fluidic manifold 168 described in reference to FIG. 1B. Accordingly, the fluidic manifold 168 may help direct the flow in and/or out of the flow cell 170. The fluidic manifold 168 may comprise one or more valves and/or pumps to help direct the fluid through the flow cell 170, which in turn may be controlled by the controller 120 described in reference to FIG. 1A.

The inlet port 174 and outlet port 175 may be positioned at opposite ends of the fluid channel 172 to facilitate flow of the cell suspension through the fluid channel 172. For example, the inlet port 174 may be positioned at a first end of the fluid channel 172 and the outlet port 175 may be positioned at a second end of the fluid channel 172, relative to the longitudinal dimension (e.g., length) of the fluid channel 172. The relative positions of the inlet port 174 and outlet port 175 may help facilitate unidirectional flow along the length of the fluid channel 172. Unidirectional flow of the cell suspension along the fluid channel 172 may help prevent clogging. In some variations, the cell sorting module 166 may be oriented in an upright configuration, such that the inlet port 174 may be positioned higher than the outlet port 175, relative to a vertical dimension defined by the cell sorting module. The upright configuration of the cell sorting module 166 may leverage gravity to facilitate fluid flow through the fluid channel 172, alone or in combination with the fluid control provided via the fluidic manifold 168 and pump.

The gas port 176 may similarly extend through the film 173, such that gas may flow into the fluid channel 172. The gas port 176 may be positioned at the first end of the fluid channel 172 adjacent to the inlet port 174. The gas port 176 may be fluidically connected to the purge line 177 of the cell sorting module 166. For example, the purge line 177 may be configured to transfer a fluid (e.g., air bubbles, a liquid) into the fluid channel 172. The purge line 177 may be fluidically connected to the fluidic manifold 168 described in reference to FIG. 1B. The fluid introduced by the purge line 177 may be configured to flow through the flow cell 170 such that the fluid may interact with cells contained therein. For example, in some variations, the purge line 177 may perform a purging process, such as a bubble sweep. The purging process may introduce air bubbles into the flow cell 170 to release any targeted cells that may be adhered (e.g., stuck) to one or more sidewalls of the fluid channel 172 and/or film 173. That is, targeted cells may be adhered to one or more sidewalls by one or more stiction forces such as a capillary force, electrostatic force, van der Waals force, and a residual stress. The fluid (e.g., air bubbles) provided by the purge line 177 may apply a force to the stuck cells greater than the one or more stiction forces. The force applied by the purge line fluid may be determined by one or more of a fluid flow rate, fluid density, fluid temperature, and fluid pressure. For example, the purge line 177 may introduce a fluid at a flow rate between about 1 mL/min and about 50 mL/min, about 1 mL/min and about 45 mL/min, or about 1 m/min and about 40 mL/min. For example, in some variations, the flow rate may be about 1 mL/min, about 5 mL/min, about 10 mL/min, about 15 m/min, about 20 mL/min, about 25 mL/min, about 30 mL/min, about 35 mL/min, about 40 mL/min, about 45 mL/min, or about 50 mL/min. The fluid may be introduced at a pressure between about 1 psi and about 15 psi, about 1 psi and about 12 psi, or about 1 psi and about 10 psi. For example, in some variations, the pressure may be about 1 psi, 2 psi, 3 psi, 4 psi, 5 psi, 6 psi, 7 psi, 8 psi, 9 psi, or 10 psi. In some variations, a volume of the fluid introduced by the purge line 177 may be between about 1 mL and about 150 mL, about 1 mL and about 120 mL, or about 6 mL and about 120 mL. For example, in some variations, the volume may be about 1 mL, about 6 mL, about 10 mL, about 20 mL, about 30 mL, about 40 mL, about 50 mL, about 60 mL, about 70 mL, about 80 mL, about 90 mL, about 100 mL, about 110 mL, or about 120 mL.

The flow cell 170 may be configured to facilitate one or more measurements. For example, the flow cell 170 may be transparent such that one or more sensors (e.g., optical sensors, such as a camera) can measure one or more parameters of the cell solution contained within the flow cell 170. Accordingly, the flow cell 170, including fluid channel 172 and/or film 173, may be manufactured from a material configured to facilitate the one or more measurements and/or withstand the environmental conditions (e.g., flow rates, pressures, temperatures) associated with the cell suspension. For example, the components of the flow cell 170, including the film 173, may be manufactured from a transparent material. In some variations, the material may comprise a plastic (e.g., polyethylene terephthalate glycol, polymethyl methacrylate) or a glass.

Figure 4A:
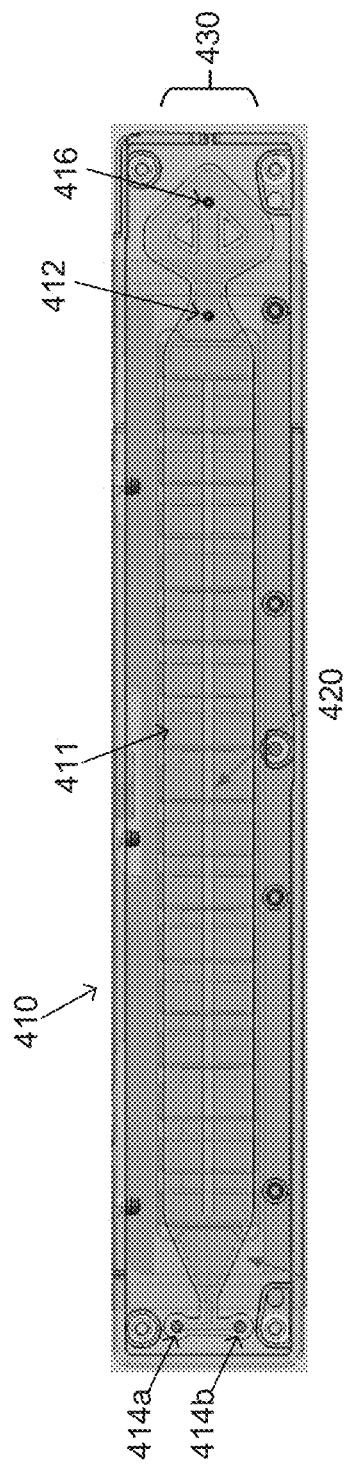
FIG. 4A is atop view rendering of an illustrative variation of a flow cell of a cell sorting module.

FIG. 4A shows a rendering of an exemplary variation of a flow cell 410 within a cell sorting module of a cartridge engaged with (e.g., coupled to) a magnetic array 420 of a cell sorting instrument within a workcell. The flow cell 410 may comprise a fluid channel 411, an inlet port 412, a first outlet port 414a, a second outlet port 414b, and a gas port 416. The inlet port 412 may be positioned at a first end of the fluid channel 411. The gas port 416 may also be positioned at the first end of the fluid channel 411. The gas port 416 may be positioned such that any fluid (e.g., gas) introduced via the gas port 416 may flow past the inlet port 412. The positioning of the gas port relative to the inlet port may increase the efficacy of the fluid introduced via the gas port in removing any cellular material in any location within the fluid channel 411. The outlet ports 414a, 414b may be positioned at a second end of the fluid channel 411, where the second end is opposite the first end. Accordingly, fluid (e.g., cell suspension) may flow into the inlet port 412, along the entire fluid channel 411, and out of the outlet ports 414a, 414b. The fluid channel 411 may comprise a width 430. The width 430 may correspond to a width of the magnetic array 420 to facilitate even application of a magnetic field generated by the magnetic array 420, as will be described further herein.

Figure 4B:
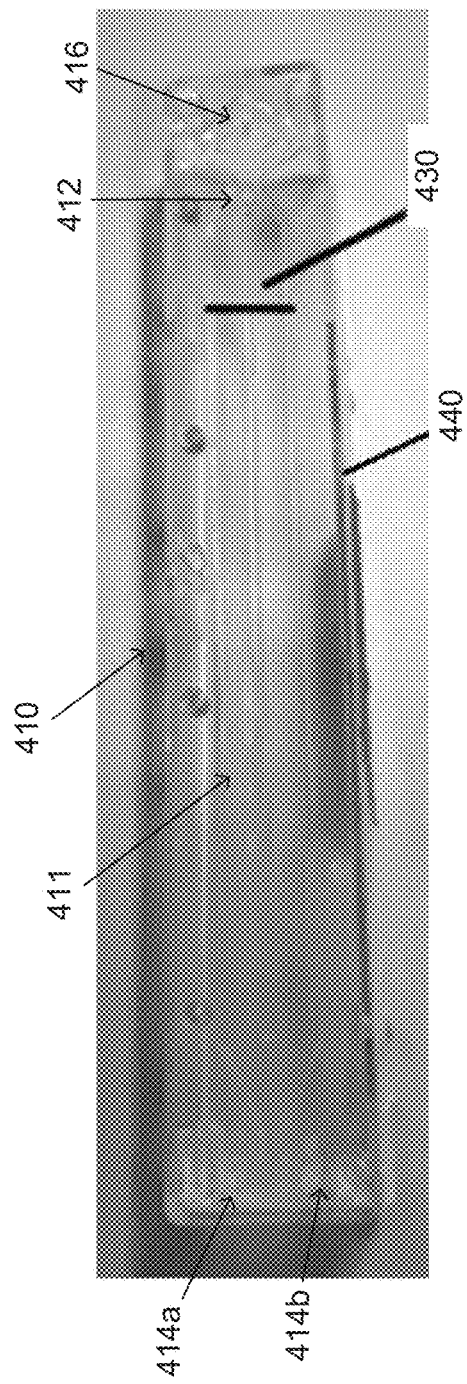
FIG. 4B is a top view of an illustrative variation of a flow cell of a cell sorting module.

FIG. 4B shows an exemplary variation of the flow cell 410 that may not be engaged with a magnetic array. As shown, the flow cell 410 may comprise a film 440 configured to cover a fluid channel 411. The film 440 may be configured to provide a fluid barrier between the fluid channel 411 and an external environment, such that a cell suspension may flow through the fluid channel 411 without leaking. Therefore, the film 440 may advantageously have a thickness sufficient to withstand pressures, temperatures, and/or flow rates associated with the cell suspension without cracking, fracturing, shattering, or otherwise breaking, while still being configured to minimize a distance between the cell suspension flowing through the fluid channel 411 and a magnetic array engaged with (e.g., coupled to) the flow cell 410. Accordingly, the film 440 may comprise a thickness of between about 50 microns to about 500 microns, about 100 microns to about 500 microns, about 200 microns to about 400 microns, or about 250 microns to about 350 microns, including about 100 microns, about 200 microns, about 300 microns, or about 400 microns. The fluid channel 411, which may be covered by the film 440, may comprise a volume configured to contain the batch of cell suspension. For example, in some variations, the fluid channel 411 may be configured to hold a volume of fluid between about 0.5 mL to about 25 mL, about 1 mL to about 20 mL, or about 1 mL to about 15 mL, including about 1 mL, about 5 mL, about 8 mL, about 10 mL, about 12 mL, or about 15 mL. The batch of cell suspension may comprise a volume that may be the same as the fluid channel volume, or may be less. For example, in some variations, the batch of cell suspension may comprise a volume of about 0.5 mL to about 25 mL, about 1 mL to about 15 mL, about 6 mL to about 12 mL, or about 8 mL to about 10 mL, including about 5 mL, about 8 mL, about 9 mL, about 10 mL, or about 12 mL. Accordingly, the volume of cell suspension may be configured to avoid a buildup of pressure applied to the sidewall(s) of the flow cell, which may otherwise occur if the volume of cell suspension is greater than the volume of the flow cell.

Figure 4C:
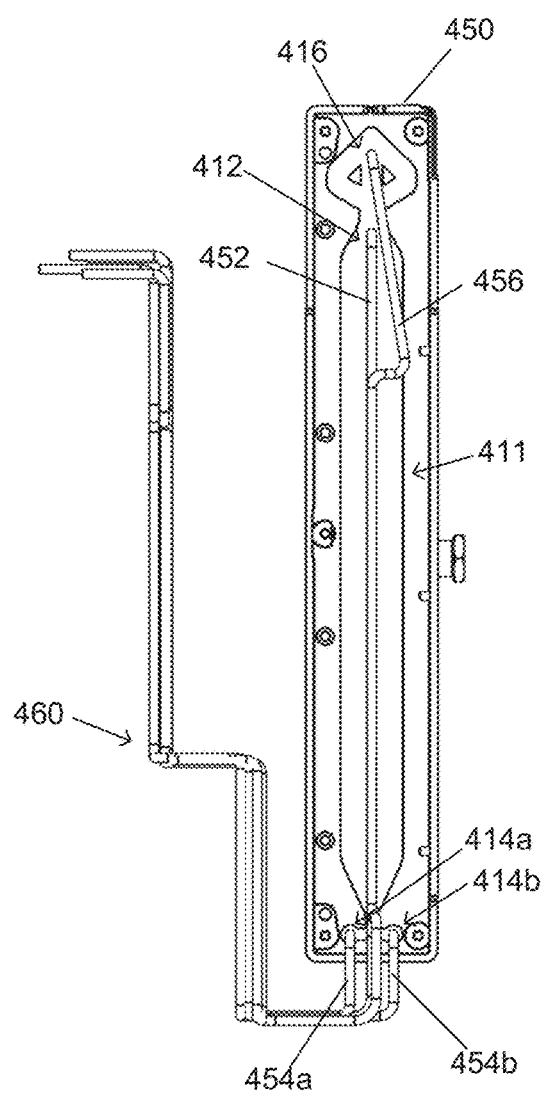
FIG. 4C is a top view rendering of another variation of a flow cell of a cell sorting module.
Figure 4D:
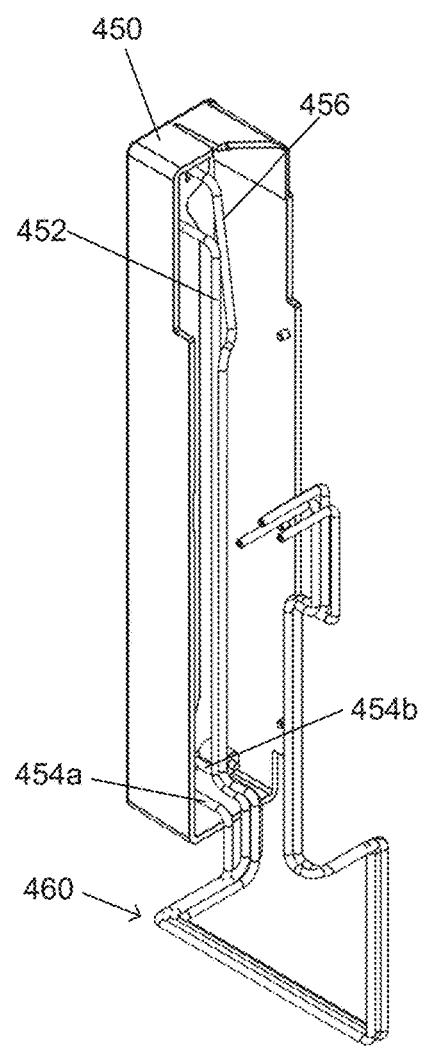
FIG. 4D is a perspective view of the flow cell shown in FIG. 4C.

FIGS. 4C and 4D show the flow cell 410 coupled to a plurality of fluid conduits (e.g., tubes) 460, which may fluidically connect the flow cell 410 to a fluidic manifold (not shown). The flow cell 410 may comprise a flow cell body 450 configured to house the fluid channel 420 and at least a portion of the fluid conduits 460 connected to the flow cell 410, which may prevent damage to a connection point between a fluid conduit and the flow cell 410. As shown, the fluid conduits 460 of the flow cell 410 may comprise an inlet fluid conduit 452 coupled to the inlet port 412, a first outlet fluid conduit 454a coupled to the outlet port 414a, a second outlet fluid conduit 454b coupled to the outlet port 414b, and a purge line 456 coupled to the gas port 416. The inlet fluid conduit 452 may be configured to transfer a fluid, such as an unsorted cell suspension, into the fluid channel 411 via the inlet port 412. The outlet fluid conduits 454a, 454b may be configured to transfer a fluid, such as sorted components of the cell suspension, out of the fluid channel 411 via the outlet ports 414a, 414b. The purge line 456 may be configured to transfer a fluid (e.g., gas) into the fluid channel 411 via the gas port 416. For example, the purge line 456 may be used to introduce air into the fluid channel 411 after the non-targeted material of the cell suspension may be removed from the fluid channel 411, such that only targeted cells, including stuck cells, remain within the fluid channel 411. Accordingly, the air introduced via the purge line 456 may be configured to loosen the stuck cells, such that substantially all targeted cells may be removed from the fluid channel 411. For example, the purge line 456 may introduce air at a flow rate of between about 1 mL/min and about 40 mL/min and/or a pressure of between about 1 psi and about 10 psi. The volume of air introduced by the purge line 456 may be between about 6 mL and about 120 mL.

The fluid conduits 452, 454a, 454b, 456 may each have dimensions (e.g., diameter, length, etc.) configured to facilitate fluid transfer to and/or from the flow cell 410 in accordance with a pre-determined flow rate in accordance with a predetermined workflow. For example, a diameter of each fluid conduit 452, 454a, 454b, 456 may be determined to minimize pressure drop of a fluid flowing therethrough. The diameter of each fluid conduit 452, 454a, 454b, 456 may be the same or different as each other. In some variations, the diameter of each fluid conduit 452, 454a, 454b, 456 may be between about 1 mm and about 4 mm. For example, in some variations, the diameter of one or more of the fluid conduits 452, 454a, 454b, 456 may be about 1 mm, about 1.5 mm, about 2 mm, about 2.5 mm, about 3 mm, about 3.5 mm, or about 4 mm. The flow rate either in or out of the flow cell 410 may be between about 1 mL/min to about 40 mL/min, about 3 mL/min to about 35 mL/min, or about 4 mL/min to about 30 mL/min, including about 4 m/min, about 10 mL/min, about 20 mL/min, or about 30 mL/min. In some variations, the cell suspension may be statically maintained within the flow cell 410. Statically maintaining the cell suspension within the flow cell 410 may advantageously facilitate increased efficacy of the cell sorting process. For example, a static cell suspension may reduce a drag force such that a magnetophoretic force applied by the magnetic array may be the greatest force applied to the cell suspension. Additionally or alternatively, statically maintaining the cell suspension may increase the period of time in which the targeted cells may be proximate to the magnetic array, such that a greater percentage of targeted cells may be attracted to the magnetic array. For example, the cell suspension may be maintained within the flow cell 410 for a period of between about 1 minute to about 10 minutes, about 2 minutes to about 8 minutes, or about 3 minutes to about 6 minutes, including about 1 minute, about 2 minutes, about 3 minutes, about 4 minutes, about 5 minutes, about 6 minutes, about 7 minutes, about 8 minutes, about 9 minutes, or about 10 minutes. The time period in which any portion of the cell suspension may be maintained within the flow cell 410 may correspond to the volume of the batch of cell suspension. That is, the time period may be proportional to the batch volume, such that increasing the batch volume may correspond to an increase in the time period and a decrease in the batch volume may correspond to a decrease in the time period.

Figure 6A:
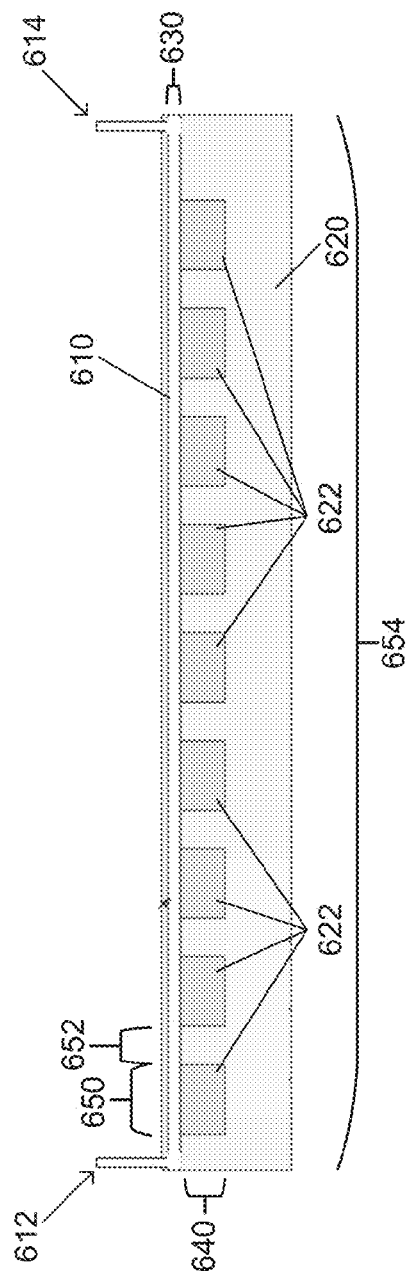
FIG. 6A shows a side view of an illustrative variation of a magnetic array engaged with a flow cell.

FIG. 6A illustrates an exemplary variation of a flow cell 610 of a cell sorting module engaged with a magnetic array 620 of a cell sorting instrument within a workcell. The flow cell 610 may comprise an inlet port 612 and an outlet port 614. The flow cell 610 may comprise a length 654 that may represent the distance between the inlet port 612 and the outlet port 614. The length 654 may, in part, determine the quantity, strength, and/or spacing of the magnets 622 of the magnetic array 620, as will be described in further detail below. The magnets 622 may comprise a magnet width (w) 650. The flow cell 610 may comprise a height 630 that may represent the height of the fluid channel. The height 630 may correspond to the magnet width (w) 650. That is, the height 630 may be determined by the magnetic flux density of the magnetic field generated by the magnets 622, such that the magnetic flux density is sufficient at any location within the fluid channel to attract magnetic particles used in the cell sorting methods described herein. In some variations, the height of the flow cell 610 may be between about $\frac{1}{16}$w to about $\frac{1}{4}$w, about $\frac{1}{12}$w to about $\frac{1}{8}$w, or about $\frac{1}{11}$w to about $\frac{1}{9}$w, including about $\frac{1}{12}$w, about $\frac{1}{10}$w, or about $\frac{1}{8}$w.

Furthermore, the height 630 may advantageously accommodate magnetic particles that may be micrometer-sized and/or nanometer-sized. That is, the height of the fluid channel may be such that the magnetic particles may flow through the fluid channel without sticking to the sidewalls defined by the fluid channel and/or the film, which may prevent the magnetic particles from clogging or otherwise restricting fluid flow through the fluid channel. The height may also facilitate rinsing, washing, and/or purging the flow cell by providing adequate volume around any cells that may be stuck within the flow cell due to one or more stiction forces. In some variations, the height may also facilitate high cell processing throughput by accommodating relatively high flow rates, various magnetic particle sizes, and/or fluid volumes, which may advantageously provide flexibility such that advanced knowledge of the desired throughput of targeted cells may not be required. Additionally, the height may also be as small as possible to maximize the effect of the magnetic field in attracting targeted cells. That is, it may be advantageous to flow the fluid within the flow cell as close as possible to the magnetic array to attract the targeted cells. For example, the flow cell 610 may comprise a height of between about 0.25 mm to about 5 mm, about 1 mm to about 3 mm, or about 1 mm to about 2 mm, including about 0.25 mm, about 1 mm, about 1.5 mm, about 2 mm, about 2.5 mm, about 3 mm, about 3.5 mm, about 4 mm, about 4.5 mm, or about 5 mm.

B. Instrument

The cell sorting modules within a cell processing cartridge as described herein correspond to a cell sorting instrument configured to perform cell sorting within a cell processing workcell. For example, the workcell may comprise a bay having a cell sorting instrument with one or more components that may interact or releasably couple to the cell sorting module of the cartridge to perform a cell sorting process. The one or more components of the cell sorting instrument may include a magnetic array having one or more magnets, which may be configured to generate a magnetic field configured to attract magnetic particles coupled to targeted cells (e.g., magnetically tagged cells). The magnetic array may be movable and/or releasably couplable to the cell processing module within the cartridge, such that the magnetic field may be selectively applied to targeted cells flowing through a flow cell of a cell sorting module. In some variations, the magnetic field may be substantially uniform across the flow cell, such that the targeted cells may be attracted to the magnetic array at any location within the flow cell.

Figure 1D:
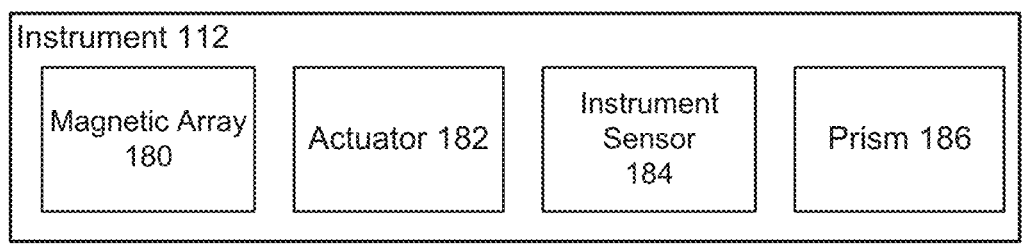
FIG. 1D is a block diagram of an instrument of the cell processing system of FIG. 1A.

Referring to FIG. 1D, a block diagram of an exemplary variation of a cell sorting instrument 112 is shown. The cell sorting instrument 112 may comprise components configured to perform cell sorting. As shown, the cell sorting instrument 112 may comprise a magnetic array 180, an actuator 182, a sensor 184, and a prism 186. The magnetic array 180 may comprise one or more magnets configured to generate a magnetic field. The one or more magnets may be permanent magnets, temporary magnets, and/or electromagnets. The magnetic field generated by the magnetic array 180 may be configured to attract magnet particles, such as the magnetic particles coupled to targeted cells in a cell suspension. The magnets of the magnetic array 180 may be arranged to be coplanar with each other. Systems that utilize a magnetic array with a three-dimensional arrangement of magnets, such as a U-shaped arrangement, may require manually coupling the magnetic array to a fluid container that may contain a cell suspension. Accordingly, the coplanar arrangement utilized by the magnetic array 180 described herein may facilitate automation, as coupling the magnetic array 180 to the flow cell 170 may be achieved by contact between the planar magnetic array and the planar flow cell.

The magnets of the magnetic array 180 may be arranged such that the magnetic field generated by the magnets extend through substantially all of the fluid channel 172 described in reference to FIG. 1C. Accordingly, a targeted cell in any portion of the fluid channel 172 may experience a magnetic field with a strength sufficient to attract the targeted cell towards the magnetic array 180. The magnetic array 180 may be coupled to the actuator 182. The actuator 182 may be configured to move the magnetic array 180. For example, the actuator 182 may translate the magnetic array 180 in a direction perpendicular to the flow cell 170. The translation of the magnetic array 180 by the actuator 182 helps to engage (e.g., couple) and/or disengage (e.g., decouple) the magnetic array 180 from the flow cells described herein. For example, the actuator 182 may translate the magnetic array 180 in a first direction (e.g., extend the actuator 182) to engage the magnetic array 180 to the flow cell 170, and may translate the magnetic array 180 in a second opposite direction (e.g., retract the actuator 182) to disengage the magnetic array 180 from the flow cell 170. When the magnetic array 180 is engaged with the flow cell 170, the magnetic field generated by the magnetic array 180 may interact with the cell suspension flowing through the fluid channel 172. When the magnetic array 180 is disengaged from the flow cell 170, the magnetic field generated by the magnetic array 180 does not interact with the cell suspension flowing through the fluid channel 172. The magnetic array may comprise one or more magnets to generate a magnetic field of sufficient strength to perform the cell sorting processes described herein. For example, in some variations, the magnetic array 180 may comprise between 1 and 30 magnets, 1 and 20 magnets, 5 and 20 magnets, or 7 and 17 magnets, including 1 magnet, 5 magnets, 7 magnets, 10 magnets, 15 magnets, or 17 magnets. The one or more magnets of the magnetic array 180 may comprise a magnetic material, such as a metal (e.g., iron, cobalt, nickel, samarium, neodymium, or an alloy thereof). For example, the magnets may comprise neodymium of a grade (e.g., magnetic strength) between N35 and N55 or N35 and N52. In some variations, the neodymium may comprise a grade of N35, N38, N40, N45, N48, N50, N52, or N55. In some variations, the one or more magnets may be permanent magnets, such that a magnetic field may be permanently generated. In further variations, the one or more magnets may be electromagnet(s), such that a current may be used to control the magnetic field. That is, the current may be proportional to the strength of the magnetic field. For example, a current between about 0 A to about 10 A may be applied to the electromagnet(s). Accordingly, one or more wires may be connected to the magnetic array 180 such that an electrical signal may be provided to the magnetic array 180. The current provided via the electrical signal may be controlled by a controller, such as the controller 120 described in reference to FIG. 1A. In still further variations, the magnetic array 180 may comprise a mix of permanent magnets and electromagnets, such that the magnetic field may be increased by applying a current, if necessary to perform the cell sorting process.

Any number and type of sensor may be used with the cell sorting modules and cell sorting instruments described herein. For example, instrument sensor 184 may be configured to measure one or more parameters associated with the cell suspension, such as cell count value, cell density value, cell size value, flow rate, pH, and/or a dissolved oxygen value. In some variations, the sensor 184 may comprise an optical sensor, such as a camera. The instrument sensor 184 may be positioned adjacent flow cell 170. In some variations, the instrument sensor 184 may utilize one or more mirrored surfaces to define an optical path between the instrument sensor 184 and the flow cell 170. For example, a prism 186 may be configured to provide an optical path through or around the cell sorting module 166. The optical path provided by the prism 186 may be necessary due to the position of the instrument sensor 184 relative to the flow cell 170. That is, the instrument sensor 184 may not have a direct line-of-sight to the flow cell 170 because other components of the cartridge may prevent directly coupling the instrument sensor 184 to the flow cell 170. Accordingly, the prism 186 may comprise one or more mirrors configured to provide an optical path between the sensor 184 and the flow cell 170. For example, the one or more mirrors may provide an optical path around one or more components that would otherwise prevent the instrument sensor 184 from observing the flow cell 170. The one or more mirrors may reflect light such that the optical path travels around one or more corners. In some variations, the prism 186 may comprise 1, 2, 3, 4, 5, 6, 7, 8, 9, or 10 mirrors. The mirror(s) of the prism 186 may have any suitable shape e.g., a square, a rectangle, a circle, or a combination thereof. The mirror(s) of the prism 186 may comprise a material configured to provide a mirrored surface, such as a glass, a metal, or a combination thereof. The optical path will be described in further detail below, particularly in reference to FIG. 3C.

Figure 3B:
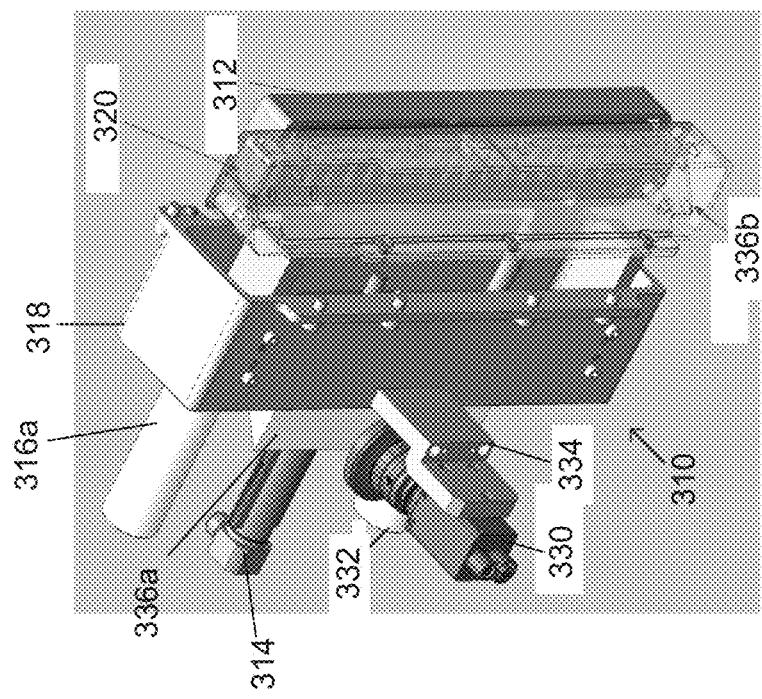
FIG. 3B is a perspective view of a rendering of the illustrative variation of the instrument and cell sorting module shown in FIG. 3A.
Figure 3A:
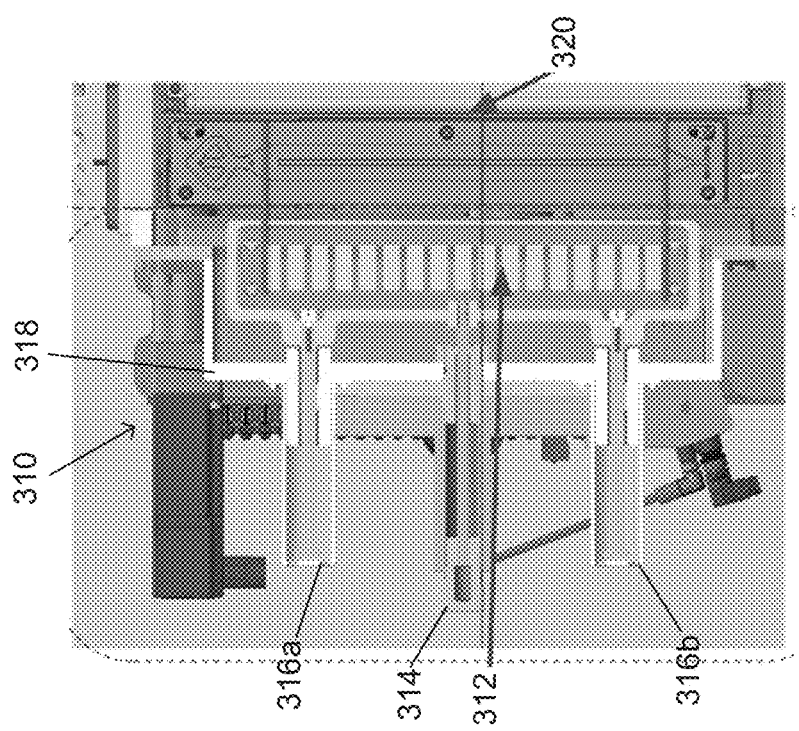
FIG. 3A is a cross-sectional view of an illustrative variation of a portion of an instrument engaged with a cell sorting module within a cartridge via a magnetic array.
Figure 3C:
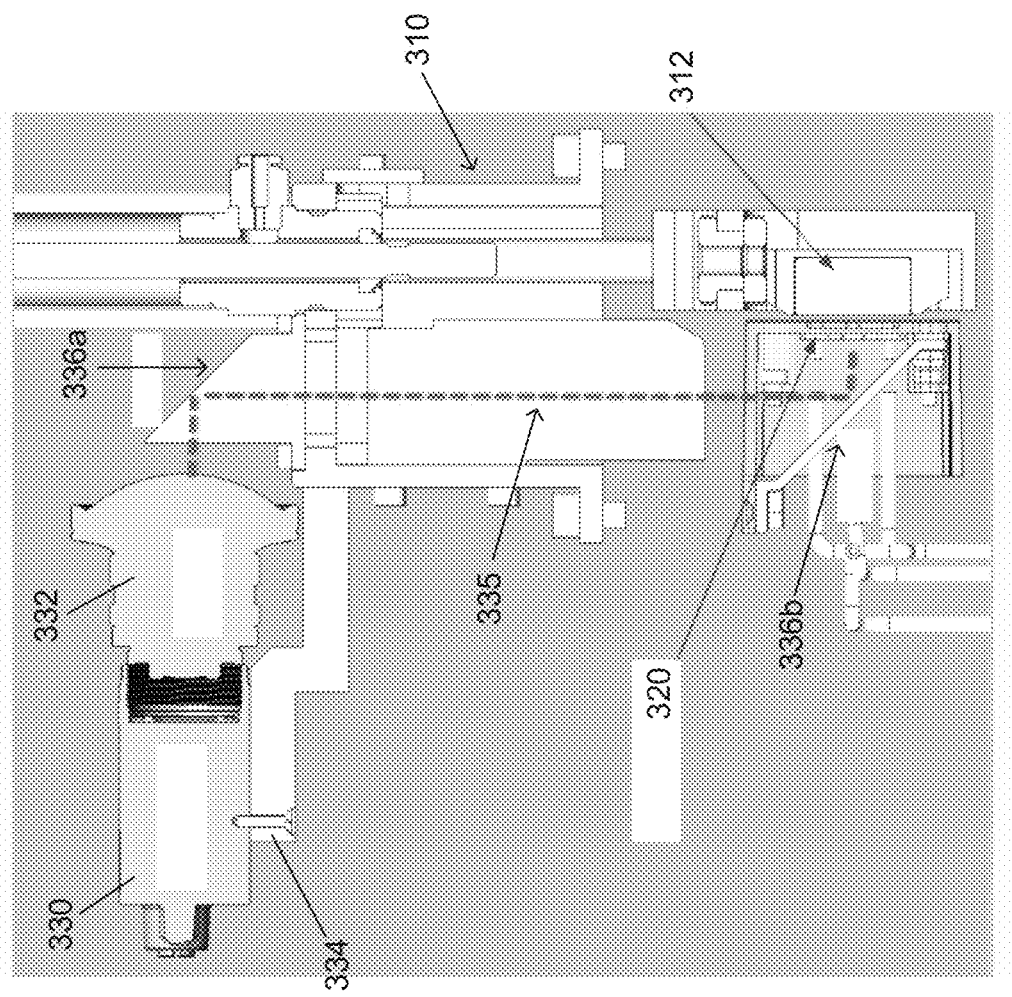
FIG. 3C is a cross-sectional view of the instrument and cell sorting module shown in FIG. 3B that illustrates an optical path.

FIGS. 3A-3C illustrate exemplary variations of a flow cell 320 engaged with a cell sorting instrument 310. The cell sorting instrument 310 may comprise a magnetic array 312, a piston 314, guides 316a, 316b, an array housing 318, a camera 330 comprising a lens 332, a camera support 334, and mirrors 336a, 336b. The piston 314 may be coupled to the magnetic array 312. The piston 314 may be configured to move the magnetic array 312 between a retracted configuration and an extended configuration. FIG. 3A shows the magnetic array in the retracted configuration, such that the magnetic array 312 may be received within the array housing 318. When in the retracted configuration, the magnetic array 312 is disengaged from the flow cell 320 so that no cell sorting is performed.

FIG. 3B shows the piston 314 and magnetic array 312 in the extended configuration. In the extended configuration, the magnetic array is proximate to the flow cell 320 and the magnetic field may be applied to targeted cells therein. The magnetic array 312 may move between the extended and retracted configurations via the piston 314 and guides 316a, 316b, which will be described in further detail below in reference to FIGS. 5A and 5B.

FIG. 3B also shows camera 330 coupled to the array housing 318 via the camera support 334. The camera support 334 may be coupled to the array housing 318 adjacent a first end of the array housing 318. The flow cell 320 may be positioned adjacent a second end of the array housing 318. Accordingly, the camera 330 may not have a direct line-of-sight to the flow cell 320. Therefore, the mirrors 336a, 336b may define a prism configured to provide an indirect line-of-sight between the camera 330 and the flow cell 320. The line-of-sight may be referred to as an optical path.

FIG. 3C illustrates an exemplary variation of an optical path 335 from the camera 330 to the flow cell 320. Due to spatial constraints imposed by the cell sorting instrument 310, the camera 330 may be positioned offset from the flow cell 320 such that the camera 330 may not have a direct line-of-sight to the flow cell 320. Accordingly, the camera 330 may utilize one or more prisms comprising one or more mirrors to reflect light from the flow cell 320 to the camera 330, as described above. As shown, the camera 330, via the lens 332, may be pointed at the first mirror 336a. The first mirror 336a may be angled relative to the camera 330. For example, the first mirror 336a may be angled relative to the camera 330 between about 5 degrees to about 85 degrees, about 20 degrees to about 60 degrees, about 30 degrees to about 60 degrees, or about 40 degrees to about 50 degrees, including about 40 degrees, about 45 degrees, or about 50 degrees. In some variations, the first mirror 336a may be angled such that an optical path from the camera 330 may be redirected towards the second mirror 336b. The second mirror 336b may be angled relative to the flow cell 320. For example, the second mirror 336a may be angled relative to the flow cell 320 between about 5 degrees to about 85 degrees, about 20 degrees to about 60 degrees, about 30 degrees to about 60 degrees, or about 40 degrees to about 50 degrees, including about 40 degrees, about 45 degrees, or about 50 degrees. The first and second mirrors 336a, 336b may be parallel to each other. In some variations, the first and second mirrors 336a, 336b may be angled relative to each other. The angle of the first and/or second mirrors 336a, 336b relative to the camera 330 and/or flow cell 320 may be determined by the position of the camera 330, the second mirror 336a, and/or the flow cell 320.

The camera 330 may be configured to generate a clear image of any location within the flow cell 320, such that the camera 330 may have a focal length corresponding to a total distance between the camera 330 and the flow cell 320. For example, the first mirror 336a may be separated from the lens 332 by a distance, such as between about 12.5 mm to about 75 mm, including about 25 mm. The second mirror 336b may be separated from the first mirror 336a by a distance, such as between about 12.5 mm to about 150 mm, including about 75 mm. The second mirror 336b may be separated from the flow cell 320 by a distance, such as between about 12.5 mm to about 50 mm, including about 12.5 mm. Accordingly, the lens 332 may comprise a focal length corresponding to a total distance between the lens 332 and the flow cell 320. The total distance between the lens 332 and the flow cell 320 may include the distance between the first mirror 336a and the lens 332, the first mirror 336a to the second mirror 336b, and the first mirror 336a to the flow cell 320. In some variations, the total distance may be between about 25 mm to about 250 mm, including about 25 mm, about 50 mm, about 75 mm, about 100 mm, about 125 mm, or about 150 mm.

As described herein, one or more components of the cell sorting instrument 500 may be movable to facilitate the cell sorting process. For example, FIGS. 5A and 5B show variations of the cell sorting instrument 500 in illustrative configurations. As shown, the cell sorting instrument 500 may comprise a magnetic array 510 comprising an array body 530, a piston 542 comprising a piston body 512 and a piston rod 540, a camera 520, an array housing 502, a first guide 514a, and a second guide 514b. The magnetic array 510 may be coupled to the piston 512. For example, the piston rod 540 of the piston 542 may be coupled to the magnetic array 510 via the array body 530. The piston 542 may be configured to move the magnetic array 510 in one or more directions. The movement of the magnetic array 510 facilitated by the piston 542 may be configured to engage and/or disengage the magnetic array 510 with a flow cell (not shown), such that the magnetic field of the magnetic array 510 may be selectively applied to the flow cell.

Accordingly, FIG. 5A shows the piston 542 in a first configuration (e.g., a retracted configuration) and FIG. 5B shows the piston 542 in a second configuration (e.g., an extended configuration). In the first configuration shown in FIG. 5A, the piston rod 540 may be received within the piston body 512. When the piston 542 is in a retracted configuration, the magnetic array 510 may similarly be in a retracted configuration, such that the magnetic array 510 is at least partially received within the array housing 502. In the retracted configuration, the magnetic field generated by the magnetic array 510 does not interact with a flow cell (not shown). In the second configuration shown in FIG. 5B, the piston rod 540 may extend from the body of the piston body 512. When the piston 542 is in the extended configuration, the magnetic array 510 may similarly be in an extended configuration, such that the magnetic array 510 is extended from the array housing 502. In the extended configuration, the magnetic field generated by the magnetic array 510 interacts with a flow cell (not shown). The movement of the piston 542 from the retracted configuration to the extended configuration may be in a first direction, and the movement of the piston 542 from the extended configuration to the retracted configuration may be in a second opposite direction.

The magnetic array 510, via the array body 530, may be configured to move without tilting, twisting, or bending such that the coplanarity of the magnets of the magnetic array 510 may be maintained. For example, the array body 530 may comprise one or more openings configured to receive the first and second guides 514a, 514b. The first and second guides 514a, 514b may comprise elongate members (e.g., rods) coupled to the array housing 502. The first and second guides 514a, 514b may be configured to be stationary. The first and second guides 514a, 514b may be parallel to each other and/or with the piston rod 540. Accordingly, the first and second guides 514a, 514b may prevent the magnetic array 510 from twisting around the axis defined by the piston 540 as the piston rod 540 moves the magnetic array 510 between the extended and retracted configurations.

The flow cell and magnetic array described herein may be configured for use with either micrometer-sized or nanometer-sized magnetic particles. For example, one or more dimensions of the magnetic array may be determined for use with magnetic particles of either size. That is, the magnetic array may be configured to generate a magnetic field that extends across the flow cell to attract any targeted cells flowing therethrough, while the flow cell is sized to prevent any clogs therein. Referring back to FIG. 6A, the quantity of magnets 622 of the magnetic array 620 may be determined by one or more of the length (1) 654, the spacing distance(s) 652, and magnet width (w) 650. In some variations, the quantity of magnets, length (1) 564, spacing distance 652, and/or magnet width (w) 650 may correspond to a magnetic flux density, as will be described in further detail below. In addition, the spacing distance 652 may correlate to the magnet width (w) 650. For example, in some variations, the spacing distance 652 may be between about ¹/₁₂w to about ¾w, about w/3 to about ⅔w, or about ⅖w to about ⅗w. In some variations, the spacing distance 652 may be about w/3, about ⅖ w, about w/2, about ⅗w, about ⅔w, or about ¾w. Accordingly, in some variations, the quantity of magnets (n) may be determined using the following equation (Equation 1):

$$n = \frac{l}{s+w}$$

Figure 6B:
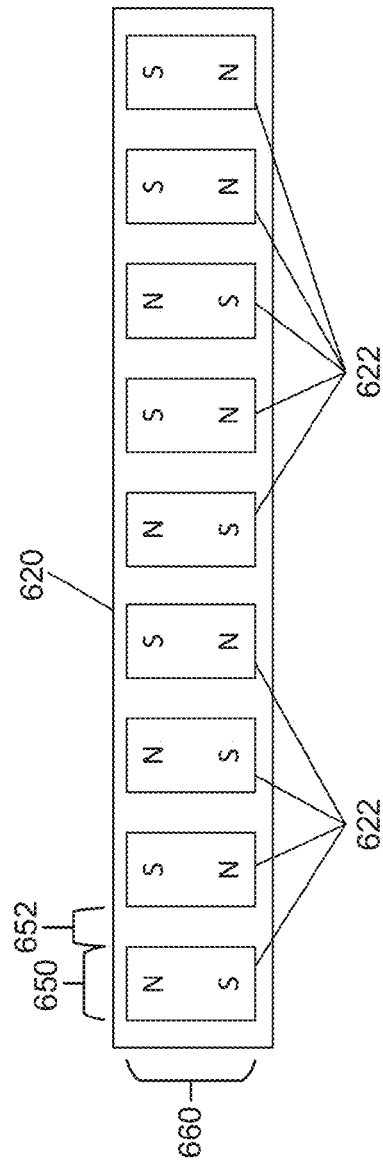
FIG. 6B shows an illustrative variation of a magnetic array of an instrument.

FIG. 6B shows the magnetic array 620 comprising the magnets 622 arranged in an exemplary configuration. As illustrated, the polarities of the magnets 622 may alternate, such that a north pole (N) of a given magnet may be positioned adjacent to a south pole (S) of a neighboring magnet. Accordingly, in some variations, the magnets 622 of the magnetic array 620 may be arranged with alternating polarities proximal to a flow cell (e.g., in an extended configuration). The alternating arrangement illustrated may be referred to as a north-south-north-south (NSNS) arrangement. The NSNS arrangement may generate a magnetic field optimized to perform the cell sorting processes described herein. The NSNS arrangement may be contrasted with a north-east-south-west (NESW) arrangement, which is typically associated with a Halbach array. Halbach arrays generally utilize magnets with square cross-sections, which may require reducing or eliminating the spacing distance between magnets to generate a magnetic field of sufficient strength to perform a cell sorting process. The NSNS arrangement described herein, however, advantageously utilizes the spacing distance to maximize the magnetic flux density, which may be evenly applied to the flow cell. Maximizing the evenly applied magnetic density flux may increase the efficacy of the magnetic array in attracting targeted cells (e.g., magnetically tagged cells) at any point within the flow cell. Additionally, or alternatively, the NSNS arrangement may reduce complexities during manufacturing or assembly, as the alternating polarities may result in the magnets attracting each other in a single direction. In contrast, an NESW arrangement may require diligent tracking of the north pole of the magnets while arranging each magnet, which may increase the complexity and time required for assembly. Furthermore, the NSNS arrangement may generate a magnetic field that may be relatively even on either side of the lateral dimension (e.g., width) of the magnetic array. Accordingly, in some variations, a cell sorting module may be positioned on either side of the magnetic array described herein, such that the cell sorting process may be performed successfully on either side of the magnetic array.

Figure 7:
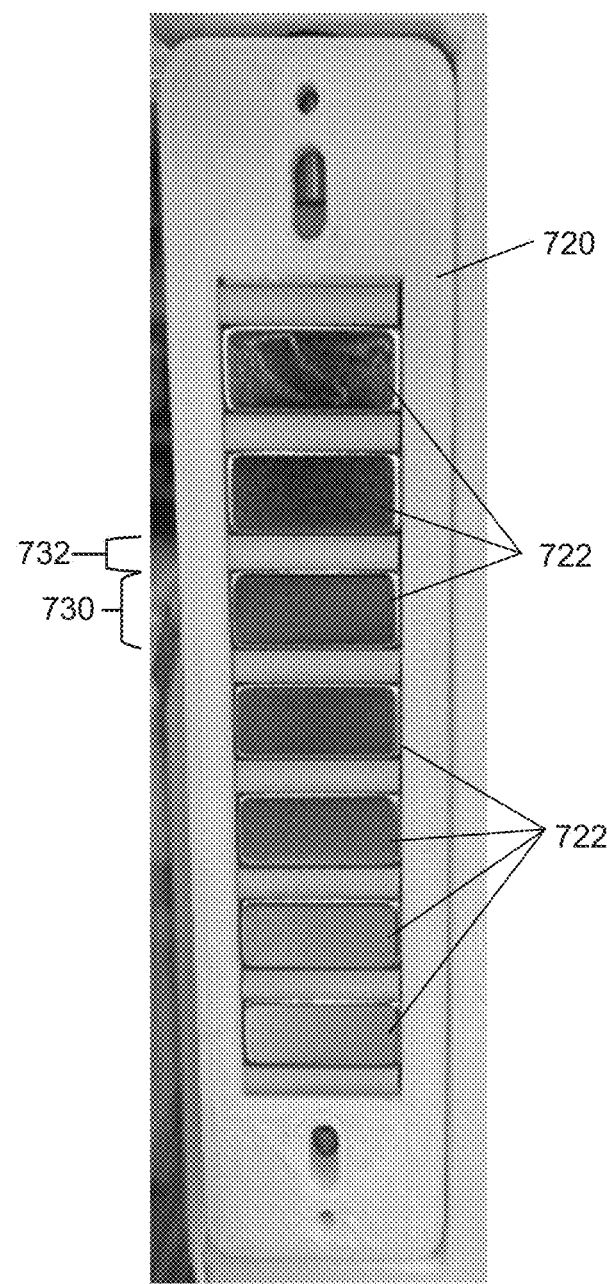
FIG. 7 shows a top view of another illustrative variation of a magnetic array of an instrument.

FIG. 7 shows an exemplary variation of a magnetic array 720. The magnetic array 720 may comprise a plurality of magnets 722, such as 2, 3, 4, 5, 6, 7, 8, 9, 10, or even more magnets. There may be an odd or even number of magnets in the array. In some variations, the array comprises 7 magnets. The magnets 722 each have a width (w) 730 and may be separated from each other by a spacing distance 732. As illustrated, the spacing distance 732 may be about w/2. The spacing distance of about w/2 may correspond to a flow cell (not shown) having a height of about w/10. Accordingly, the magnetic field generated by the magnetic array 720 may be optimized for the corresponding flow cell. That is, the width (w) 730 and/or spacing distance 732 may correspond to a magnetic flux density of sufficient magnitude to attract targeted cells that may flow through the flow cell. Furthermore, the width (w) and/or spacing distance 732 may correspond to evenly applying the magnetic flux density across the flow cell such that the targeted cells may be attracted to the magnetic array at any location within the flow cell.

The magnetic arrays described herein may comprise a plurality of magnets that may generate a magnetic field having a magnetic flux density. The magnetic flux density may correspond to the strength of the magnetic field in a given spatial region. The magnetic flux density associated with the magnetic field may be determined by one or more of a magnet length, a magnet width, and a distance between magnets. For example, the magnetic flux density may be proportional with the magnet length and the magnet width, such that the magnetic flux density may increase as the magnet length and/or magnet width may be increased. In another example, the magnetic flux density may be inversely proportional to the distance between magnets, such that the magnetic flux density may increase as the distance between magnets may be decreased. That is, decreasing the distance between magnets may generate a stronger magnetic field but may reduce an area covered by the magnetic field. Accordingly, the magnet length, magnet width, and/or distance between magnets may be optimized to generate a magnetic field with a magnetic flux density suitable for a pre-determined area, as will be described in more detail below.

Figure 8:
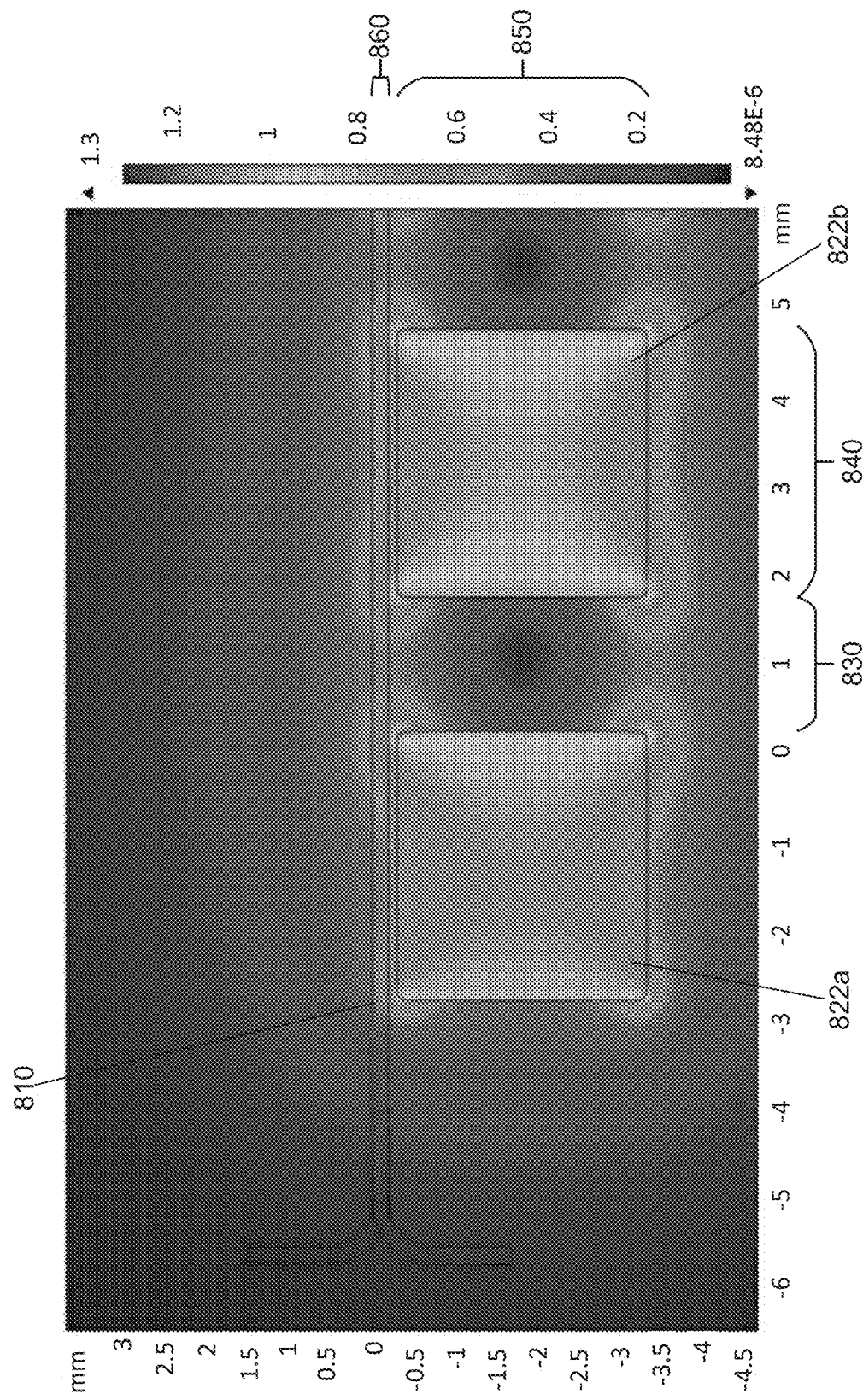
FIG. 8 shows a plot of magnetic flux density of a magnetic array of an instrument.

FIG. 8 illustrates magnetic flux density of an illustrative variation of a magnetic array. The magnetic array includes a first magnet 822a and a second magnet 822b. The first magnet 822a may be oriented such that a north pole may be adjacent to the flow cell 810 and the second magnet 822b may be oriented such that a south pole may be adjacent to the flow cell 810. Accordingly, magnetic field lines may extend between the first and second magnets 822a, 822b. The magnetic field lines may extend into the fluid channel of the flow cell 810. That is, the magnetic field lines may extend along a height 860 of the fluid channel of the flow cell 810. As illustrated, the magnetic field may have a magnetic flux density that may be relatively even along the length and/or height of the fluid channel, which may advantageously capture magnetic particles coupled to targeted cells throughout the fluid channel. For example, the magnetic flux density in the fluid channel may be between about 0.1 T to about 3 T, about 0.2 T to about 2 T, or about 0.2 T to about 1.2 T, including about 0.4 T, about 0.5 T, about 0.6 T, about 0.7 T, or about 0.8 T. The magnetic flux density may be adjusted to effectively attract substantially all of the magnetic particles that may flow through the flow cell 810. As described above, the magnetic flux density may be adjusted by changing one or more of the magnet length, magnet width, and magnet spacing.

The magnets of the magnetic array described herein may comprise one or more dimensions or materials that correspond to desired magnetic flux density. In some variations, the magnetic flux density may be determined by the material of the magnets. For example, the magnets may be manufactured from a metal (e.g., iron, cobalt, nickel, samarium, or an alloy thereof), which may have known magnetic characteristics. In further variations, as shown, the first and second magnets 822a, 822b may be similarly sized, such that each magnet may have a width 840 and a length 850. The width 840 may be between about 0.5 mm to about 5 mm, about 1 mm to about 4 mm, about 2 mm to about 3.5 mm, or about 2.75 mm to about 3.25 mm, including about 1 mm, about 2 mm, about 2.5 mm, about 3 mm, about 3.5 mm, or about 4 mm. The length 850 may about 0.5 mm to about 5 mm, about 1 mm to about 4 mm, about 2 mm to about 3.5 mm, or about 2.75 mm to about 3.25 mm, including about 1 mm, about 2 mm, about 2.5 mm, about 3 mm, about 3.5 mm, or about 4 mm. In some variations, the width 840 and length 850 may be different, such that the magnets 822a, 822b may comprise a rectangular shape. In further variations, the width 840 and length 850 may be substantially equal, such that the magnets 822a, 822b may comprise a square shape. The first and second magnets 822a, 822b may be separated by a spacing distance 730. The distance 730 may be between about 0 mm to about 4 mm, about 1 mm to about 3 mm, or about 1.5 mm to about 2 mm, including about 1 mm, about 1.5 mm, about 1.75 mm, or about 2 mm.

II. Methods of Cell Sorting

Generally, the systems and devices described herein are used in performing cell sorting methods. These methods may increase operational efficiency (e.g., reduce delays), reduce and/or eliminate manual intervention (e.g., labor), optimize workspace usage, and/or increase throughput of cell processing byproducts. The cell sorting methods may be performed automatically, such that an unsorted cell suspension may be provided to the cell sorting module, a cell sorting process may be performed, and successfully sorted cells may be transferred out of the cell sorting module upon completion of the cell sorting process, entirely without human intervention.

Figure 9:
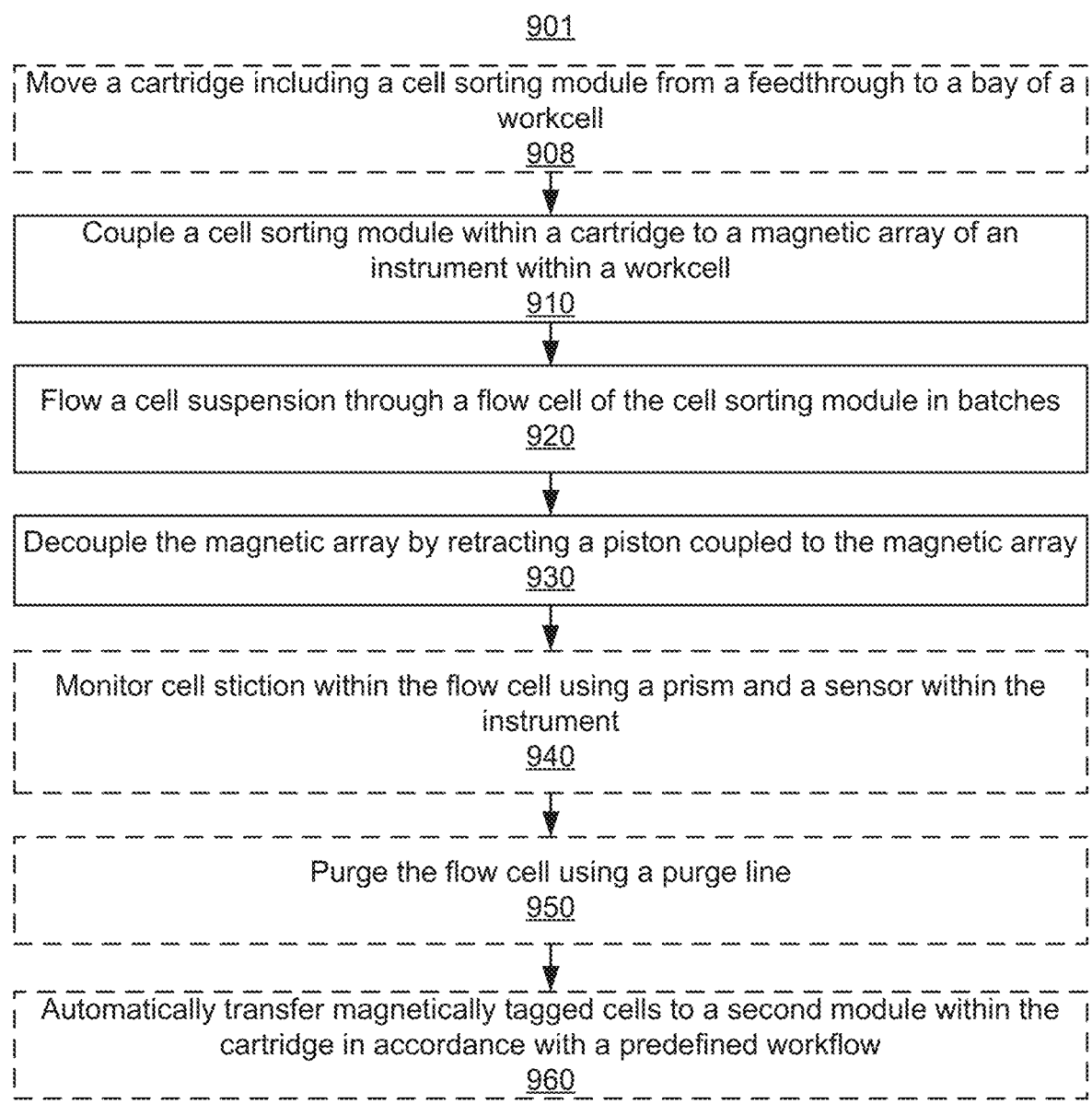
FIG. 9 is a flowchart of an illustrative variation of sorting cells using a cell processing system.

FIG. 9 provides a flowchart of an illustrative method of cell sorting in an automated workcell. As shown, a method 901 may comprise moving a cartridge including a cell sorting module from a feedthrough to a bay of a workcell 908. The workcell may include more than one bay, where each bay may comprise one or more instruments. Each instrument may be configured to perform one or more cell processing steps when coupled to a corresponding module within the cartridge. The method 901 may include coupling (e.g., engaging) the cell sorting module within the cartridge to a magnetic array of a cell sorting instrument within a workcell 910. For example, the cell sorting instrument may be included in the bay of step 908. In some variations, the cell sorting instrument may further include an actuator (e.g., a piston), a sensor (e.g., a camera), and/or a prism. Accordingly, coupling the cell sorting module to the magnetic array may include moving the magnetic array using the actuator, such that the magnetic array may be proximal to the cell sorting module (e.g., a flow cell thereof). That is, the magnetic field generated by the magnetic array may attract targeted cells flowing therethrough. The magnetic array may be moved from a retracted configuration to an extended configuration by the actuator. For example, in some variations, the actuator may comprise a piston having a piston rod and a piston body, such that the piston rod may move from a retracted configuration within the piston body to an extended configuration beyond the piston body.

The method 901 may also include flowing a cell suspension through the flow cell of the cell sorting module in batches. For example, the cell suspension may enter the flow cell through an inlet port and exit the flow cell through an outlet port thereof. In some variations, the cell suspension may be transferred to and/or from the flow cell by a fluidic manifold of the cartridge. A fluid conduit (e.g., tube) may extend from the fluidic manifold to the inlet port, and/or a fluid conduit may extend from the outlet port to the fluid manifold. The cell suspension may comprise cells tagged by micrometer-sized and/or nanometer-sized magnetic particles. In some variations, the cell suspension may include cells tagged by both micrometer-sized and nanometer-sized magnetic particles. For example, some cells within the cell suspension may be coupled to micrometer-sized magnetic particles whereas other cells may be coupled to nanometer-sized magnetic particles. The configuration of the flow cell that may accommodate micrometer-sized and/or nanometer-sized magnetic particles may advantageously increase cell processing throughput, reduce and/or eliminate clogging, enable the ability to wash, rinse, and/or purge the flow cell with or without magnetic particles therein, and/or enable the flow cell to be reused multiple times. In some variations, the micrometer-sized magnetic particles may have a diameter between about 1 micron and about 6 microns. For example, the micrometer-sized magnetic particles may be commercially available, such as ThermoFisher Scientific's Dynabeads™ FlowComp™. In some variations, the nanometer-sized magnetic particles may have a diameter between about 50 nanometers to about 150 nanometers. For example, the nanometer-sized magnetic particles may be commercially available, such as GenScript's CytoSinct™ Nanobeads or Miltenyi's MACS(R Microbeads. In some variations, a batch of the cell suspension may have a volume of between about 8 mL to about 10 mL. Each batch may be maintained within the flow cell for between about 3 minutes and about 6 minutes, which may represent the period of time from the moment the batch of cell suspension initially enters the flow cell to the moment the batch of cell suspension exits the flow cell. In some variations, the cell suspension flows through the flow cell at a pre-determined flow rate, such as between about 4 mL/min to about 30 mL/min.

The method 901 may include disengaging (e.g., decoupling) the magnetic array by retracting the actuator coupled to the magnetic array 930. For example, the actuator may transition from the extended configuration to the retracted configuration, such that the magnetic field generated by the magnetic array does not affect the flow cell, such as targeted cells flowing therethrough. In some variations, disengaging the magnetic array may be performed automatically. That is, the magnetic array may be disengaged according to a pre-defined workflow. For example, the pre-defined workflow may utilize a pre-determined time (e.g., between about 3 minutes to about 6 minutes) in which the magnetic array may be engaged with the flow cell. The pre-determined time and/or workflow may be input by a user using a controller coupled to the workcell.

In some variations, the method 901 may further include monitoring cell stiction within the flow cell using a prism and a sensor (e.g., camera) within the cell sorting instrument 940. Cell stiction may represent a quantity of targeted cells (e.g., magnetically tagged cells) that may be adhered to a surface within the flow cell, even after removal of the magnetic field generated by the magnetic array. That is, targeted cells may be adhered to one or more surfaces within the flow cell by one or more stiction forces, such as a capillary force, electrostatic force, van der Waals force, and residual stress. In some variations, monitoring cell stiction may be performed automatically by, for example, the controller. For example, the sensor may be configured to measure a cell count of targeted cells stuck within the flow cell. The measurement generated by the sensor may be compared by the controller to a pre-defined condition, which may represent a threshold value.

In further variations, the method 901 may also include purging the flow cell using a purge line 950. For example, a determination that the measurement generated by the sensor meets or exceeds the pre-defined condition may cause the purge line to perform a purging process (e.g., a bubble sweep). The purging process may be performed by transferring a gas (e.g., air bubbles) through a gas port of the flow cell using the purge line, such that the gas may release the targeted cells adhered (e.g., stuck) to a sidewall within the flow cell. That is, the gas (e.g., air bubbles) provided by the purge line may apply a force to the adhered cells that is greater than the one or more stiction forces. The purge line may be fluidically connected to the fluidic manifold, such that the fluidic manifold may control beginning and/or ending the purging process. In some variations, the gas may also be removed from the flow cell via the gas port, and returned to the fluidic manifold. In some variations, purging the flow cell may be performed automatically, such that the comparison and/or response (e.g., performing the purging process) may be performed automatically by, for example, a controller.

The method 901 may also include automatically transferring targeted cells to a second module within the cartridge in accordance with a predefined workflow 960. For example, the targeted cells may flow out of the flow cell to a fluidic manifold, such that the fluidic manifold may subsequently transfer the targeted cells to the second module. In a further example, the targeted cells may flow out of the flow cell and directly to the second module. In some variations, the targeted cells may be transferred to a second module of a different cartridge. The transferred targeted cells may be used in one or more additional cell processes (e.g., transduction, transfection, elutriation, spinoculation, expansion). In some variations, at least a portion of the targeted cells may be removed from the workcell to be used in a cell therapy.

The methods described, including any steps therein, may be repeated, such that multiple batches of cell suspensions may be processed (e.g., sorted). For example, between 1 to 40 batches, 1 to 30 batches, 1 to 20 batches, or 1 to 10 batches, including 1, 5, 10, 15, 20, or 30 batches, may be processed using the systems and methods described herein. The volume of each batch may the same or may be different. Accordingly, the systems and methods may be flexible, such that the total throughput may be adjusted in real-time without modifying (e.g., replacing one or more components) the systems and/or methods.

Throughout this application, the term "about" is used to indicate that a value includes the inherent variation of error for the device or the method being employed to determine the value, or the variation that exists among the samples being measured. Unless otherwise stated or otherwise evident from the context, the term "about" means within 10% above or below the reported numerical value (except where such number would exceed 100% of a possible value or go below 0%). When used in conjunction with a range or series of values, the term "about" applies to the endpoints of the range or each of the values enumerated in the series, unless otherwise indicated. As used in this application, the terms "about" and "approximately" are used as equivalents.

While embodiments of the present invention have been shown and described herein, those skilled in the art will understand that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An automated cell sorting system comprising:
 a cartridge having a cell sorting module, wherein the cell sorting module comprises a flow cell; and
 an instrument within a bay of a cell processing workcell, wherein the instrument comprises a magnetic array couplable to the flow cell, each of the magnets within the magnetic array having a width of w and being spaced apart by between about w/3 to about ¾w, and wherein the flow cell has a height of between about 1/12w to about ⅛w.

2. The cell sorting system of claim 1, wherein the height is between about 0.25 mm and about 3 mm.

3. The cell sorting system of claim 1, wherein the height is about 1.5 mm.

4. The cell sorting system of claim 1, wherein the magnets within the magnetic array are spaced apart by between about w/3 to about ⅔w.

5. The cell sorting system of claim 1, wherein the magnets within the magnetic array are spaced apart by between about ⅔w to about ⅗w.

6. The cell sorting system of claim 1, wherein the magnets within the magnetic array are spaced apart by about w/2.

7. The cell sorting system of claim 1, wherein the magnetic array is coupled to an actuator of the instrument, wherein the actuator is configured to translate the magnetic array.

8. The cell sorting system of claim 7, wherein the actuator comprises a piston.

9. The cell sorting system of claim 1, wherein the magnets within the magnetic array are arranged with alternating polarities proximate to the flow cell.

10. The cell sorting system of claim 1, wherein the flow cell comprises a film.

11. The cell sorting system of claim 10, wherein the film comprises a thickness of about 100 microns to about 500 microns.

12. The cell sorting system of claim 10, wherein the film is manufactured from a polymer.

13. The cell sorting system of claim 1, wherein the cell sorting module further comprises a purge line.

14. The cell sorting system of claim 1, wherein the flow cell is configured to hold a volume of between about 1 mL to about 15 mL.

15. The cell sorting system of claim 1, wherein the instrument further comprises a sensor configured to measure a parameter of the cell sorting module.

16. The cell sorting system of claim 15, wherein the sensor comprises an optical sensor.

17. The cell sorting system of claim 1, wherein the cartridge further comprises one or more additional modules selected from the group consisting of a bioreactor module, an electroporation module, an elutriation module, and a spinoculation module.

18. The cell sorting system of claim 17, wherein the cell sorting module and the one or more additional modules are fluidically connected.

19. The cell sorting system of claim 1, wherein the cell processing workcell comprises a robot configured to move the cartridge to a second bay.

* * * * *